United States Patent
Szymanski

(10) Patent No.: US 8,503,440 B2
(45) Date of Patent: Aug. 6, 2013

(54) CROSSBAR SWITCH AND RECURSIVE SCHEDULING

(76) Inventor: Tadeusz H. Szymanski, Toronto (CA)

( * ) Notice: Subject to any disclaimer, the term of this patent is extended or adjusted under 35 U.S.C. 154(b) by 204 days.

(21) Appl. No.: 13/124,923

(22) PCT Filed: Oct. 20, 2009

(86) PCT No.: PCT/CA2009/001514
§ 371 (c)(1),
(2), (4) Date: Apr. 19, 2011

(87) PCT Pub. No.: WO2010/045732
PCT Pub. Date: Apr. 29, 2010

(65) Prior Publication Data
US 2012/0033662 A1   Feb. 9, 2012
US 2012/0236849 A9   Sep. 20, 2012

Related U.S. Application Data

(60) Provisional application No. 61/136,977, filed on Oct. 20, 2008.

(51) Int. Cl.
*H04L 12/50* (2006.01)
*H04L 12/56* (2011.01)

(52) U.S. Cl.
USPC .......................................... 370/386; 370/412

(58) Field of Classification Search
USPC .................. 370/386–388, 412–417, 427–429
See application file for complete search history.

(56) References Cited

U.S. PATENT DOCUMENTS

| | | | |
|---|---|---|---|
| 6,747,971 B1 | 6/2004 | Hughes et al. | |
| 6,876,663 B2 | 4/2005 | Johnson et al. | |
| 7,154,885 B2 | 12/2006 | Nong | |
| 7,499,464 B2 * | 3/2009 | Ayrapetian et al. | 370/419 |
| 2002/0044546 A1 | 4/2002 | Magill et al. | |
| 2003/0128712 A1 * | 7/2003 | Moriwaki et al. | 370/412 |
| 2004/0081184 A1 * | 4/2004 | Magill et al. | 370/413 |
| 2005/0163138 A1 * | 7/2005 | Kanazawa | 370/412 |
| 2007/0280261 A1 | 12/2007 | Szymanski | |
| 2008/0175259 A1 | 7/2008 | Chao et al. | |
| 2009/0135832 A1 * | 5/2009 | Fan et al. | 370/395.4 |

OTHER PUBLICATIONS

International Search Report mailed Jan. 22, 2010 in relation to PCT Application No. PCT/CA2009/001514 filed Oct. 20, 2009.

(Continued)

*Primary Examiner* — Hong Cho

(57) ABSTRACT

A crossbar switch has N input ports, M output ports, and a switching matrix with N×M crosspoints. In an embodiment, each crosspoint contains an internal queue (XQ), which can store one or more packets to be touted. Traffic rates to be realized between all Input/Output (IO) pairs of the switch are specified in an N×M traffic rate matrix, where each element equals a number of requested cell transmission opportunities between each IO pair within a scheduling frame of F time-slots. An efficient algorithm for scheduling N traffic flows with traffic rates based upon a recursive and fair decomposition of a traffic rate vector with N elements, is proposed. To reduce memory requirements a shared row queue (SRQ) may be embedded in each row of the switching matrix, allowing the size of all the XQs to be reduced. To further reduce memory requirements, a shared column queue may be used in place of the XQs. The proposed buffered crossbar switches with shared row and column queues, in conjunction with the row scheduling algorithm and the DCS column scheduling algorithm, can achieve high throughout with reduced buffer and VLSI area requirements, while providing probabilistic guarantees on rate, delay and jitter for scheduled traffic flows.

25 Claims, 21 Drawing Sheets

OTHER PUBLICATIONS

Written Opinion mailed Jan. 22, 2010 in relation to PCT Application No. PCT/CA2009/001514 filed Oct. 20, 2009.

M. Hluchyi, M. Karol and S. Morgan, entitled "Input Versus Output Queueing on a Space Division Switch", IEEE Trans. Commun., vol. 35, 1987.

N. McKeown, A. Mekkittikul, V. Anantharam, J. Walrand, entitled "Achieving 100% Throughput in an Input-Queued Switch", IEEE Transactions on Communications, vol. 47, No. 8, Aug. 1999, pp. 1260-1267.

A.K. Parekh and R.G. Gallager, entitled "A Generalized Processor Sharing Approach to Flow Control in Integrated Service Networks: The Multiple Node Case", IEEE/ACM Trans. Networking, vol. 2, No. 2, pp. 137-150, 1994.

H. Lee and SW. Seo, entitled Matching Output Queueing with a Multiple Input/Output-Queued Switch, iEEE Transactions on Networking, vol. 14, No. 1, Feb. 2006, pp. 121-131.

A.K. Parekh and R.G. Gallager, entitled "A Generalized Processor Sharing Approach to Flow Control in Integrated Service Networks: The Single Node Case", IEEE/ACM Trans. Networking, vol. 1, pp. 344-357, 1993.

F. Abel et al, entitled "A Four-Terabit Packet Switch Supporting Long Round-Trip Times", IEEE Micro, vol. 23, No. 1, Jan./Feb. 2003, pp. 10-24.

D. Simos, I. Papaefstathiou and M.G.H. Katevenis, entitled "Building an FOC Using Large, Buffered Crossbar Cores", IEEE Design & Test of Computers, Nov. Dec. 2008, pp. 538-548.

SM He, ST Sun, HT Guan, Q Zheng, YJ Zhao and W Gao, entitled "On Guaranteed Smooth Scheduling for Buffered Crossbar Switches", IEEE Transactions on Networking, vol. 16, No. 3, Jun. 2008, pp. 718-731.

\* cited by examiner $$R = \begin{bmatrix} 12 & 0 & 8 & 12 \\ 4 & 8 & 18 & 2 \\ 0 & 17 & 4 & 11 \\ 16 & 7 & 2 & 7 \end{bmatrix}$$

```
100   Function [CTS, CRS] = Schedule_Matrix (R, F, N)

102   for j = 1 to N
104       assert ( sum ( R (j, 1:N)) <= F)
106       assert ( sum ( R (1:N, j)) <= F)
108   end;

110   for j = 1 to N
112       V = R(j, 1:N)
114       CTS (j, 1:F) = Recursive_Schedule_Vector (V, F, N)
116   end;

118   for k = 1 to N
120       V = R(1:N, k)
122       CRS (k, 1:F) = Recursive_Schedule_Vector (V, F, N)
124   end;
```

FIG. 4

```
130   Function Schedule = Recursive_Schedule_Vector1 ( V, F, N)

132   if (F > 1)
134       Va = floor ( V / 2 )
136       Vb = Va
138       Vrem = V - Va - Vb;
140       num_ones = sum (V_rem)
142       j = 0;

144       for k = 1: floor (num_ones/2)
146           m1 = find_next_one(Vrem, j+1, N)
148           Va (m1) = Va(m1) + 1
150           m 2 = find_next_one(Vrem, m1+1, N)
152           Vb (m2) = Vb(m2) + 1
154           j = m2
156       end;

158       if ( num_ones == an odd number)
160           m3 = find_next_one(Vrem, j+1, N)
162           if ( sum(Va(:) <= sum(Vb(:)) )
164               Va(m3) = Va(m3) + 1;
166           else
168               Vb(m3) = Vb(m3) + 1;
170           end;
172       end;

174       ScheduleA = Recursive_Schedule_vector ( Va, F/2, N)
176       ScheduleB = Recursive_Schedule_vector ( Vb, F/2, N)
178       Schedule = [ScheduleA, ScheduleB]

180   else
182       if (sum(V) == 1)
184           m1 = find_next_one(V,1, N)
186           Schedule = [m1]
188       else
190           Schedule = [-1]
192       end;
194   end;
```

FIG. 5

```
200   Function m = find_next_one( V, j, k )

202   for jj = j to k
204       if ( V(jj) == 1 )
206           m = jj
208           return
210       end;
212   end
214   m = -1
216   return
```

FIG. 6

```
220   Function Schedule = Recursive_Schedule_Vector2 ( V, F, N, Fs)
222   global Vinit;

224   if (F > Fs)
226       Va = floor ( V / 2 )
228       Vb = Va
230       Vrem = V - Va - Vb;
232       num_ones = sum (Vrem)
234       [rates, flows] = sort(Vinit, 'descend');

236       for j=1:ceil(num_ones/2)
238           rate = rate(j)
240           flow = flows(j);
242           if (Vrem(flow) == 1)
244               Va(flow) = Va(flow) + 1;
246           end;
248       end;

250       for j= (ceil(num_ones/2)+1):num_ones
252           rate = rate(j)
254           flow = flows(j);
256           if (Vrem(flow) == 1)
258               Vb(flow) = Vb(flow) + 1;
260           end;
262       end;

264       ScheduleA = Recursive_Schedule_Vector ( Va, F/2, N, Fs)
266       ScheduleB = Recursive_Schedule_Vector ( Vb, F/2, N, Fs)
268       Schedule  = [ScheduleA, ScheduleB]

260   else  % F must equal Fs
262       Schedule = Schedule_Interval(V, F, N);
264   end;
```

Va = [85, 37, 49, 59, 54, 59, 99, 67]  ⸺302b
Vb = [85, 37, 49, 59, 54, 59, 99, 67]  ⸺302c
Vrem = [ 1, 1, 0, 0, 1, 1, 1, 1]  ⸺302d Va = [85, 37, 49, 59, 54, 59, 99, 67]  ⸺302a
+[ 1, 1, 0, 0, 1, 0, 1, 0]  ⸺302e
=[86, 37, 49, 59, 55, 59, 100, 67]  ⸺302f Vb = [85, 37, 49, 59, 54, 59, 99, 67]  ⸺302c
+{ 0, 1, 0, 0, 0, 1, 0, 1}  ⸺302g
={85, 38, 49, 59, 54, 60, 99, 68]  ⸺302h

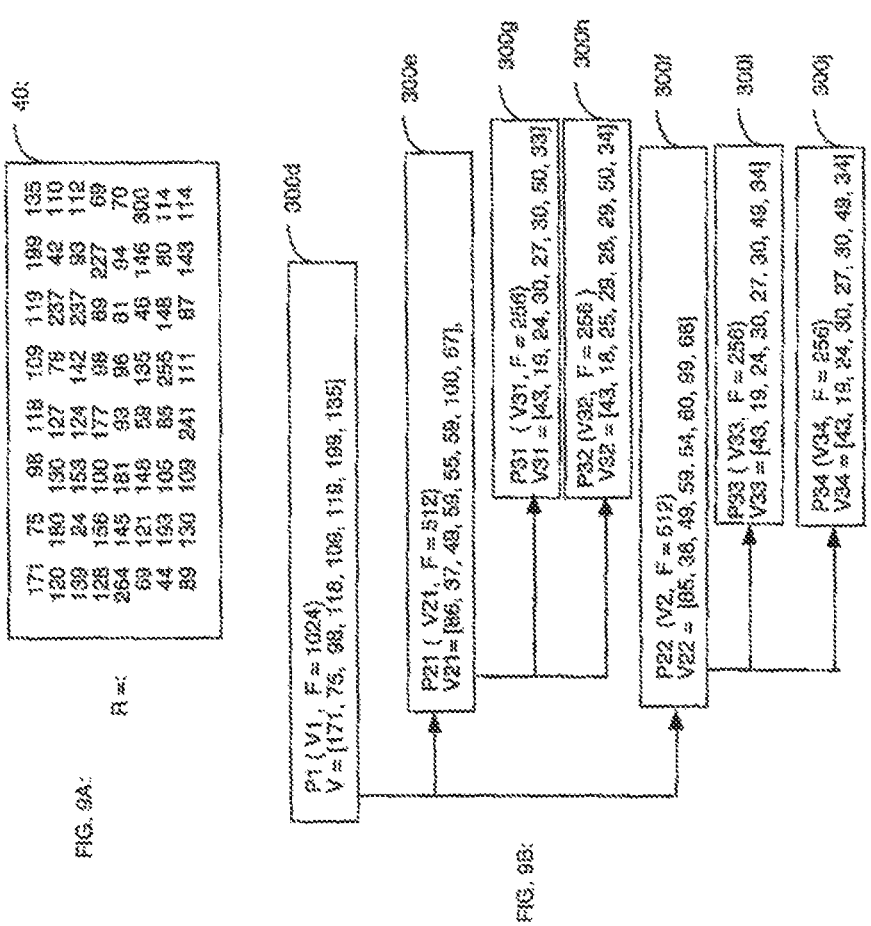

$$V = \begin{bmatrix} 171 & 75 & 98 & 118 & 109 & 119 & 199 & 135 \end{bmatrix}$$ — 302a

304

Schedule(1..64) =

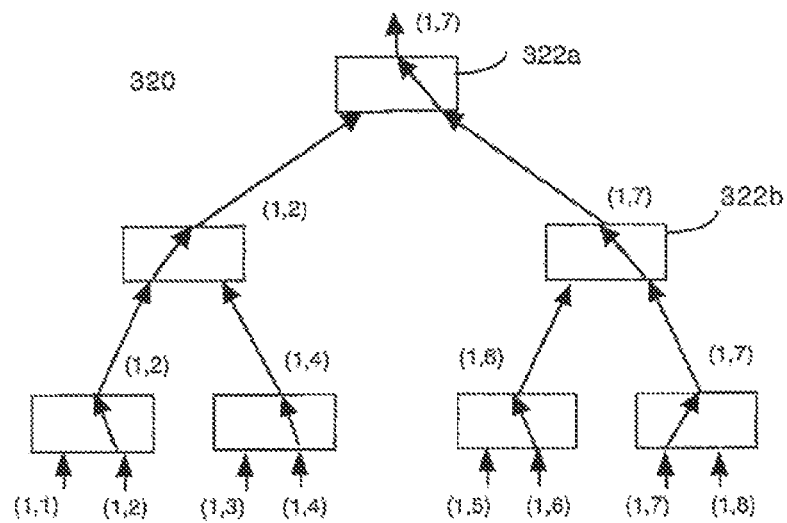
FIG. 11A:
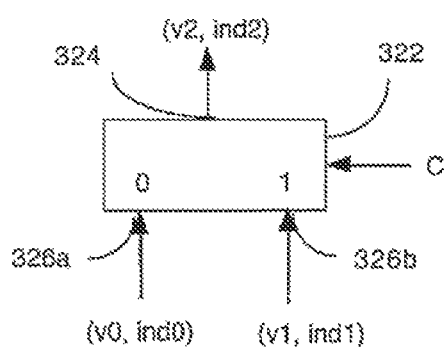
FIG. 11B
| Inputs | | Output |
|---|---|---|
| v0 | v1 | C |
| 0 | 0 | dont care |
| 0 | 1 | 1 |
| 1 | 0 | 0 |
| 1 | 1 | rand(ind0, ind1) |
FIG. 11C

| Inputs | | Output |
|---|---|---|
| v0 | v1 | C |
| 0 | 0 | dont care |
| 0 | b>0 | 1 |
| a>0 | 0 | 0 |
| a>0 | b>0 | if a>b, 0<br>if a<b, 1<br>if a==b, rand(0,1) |

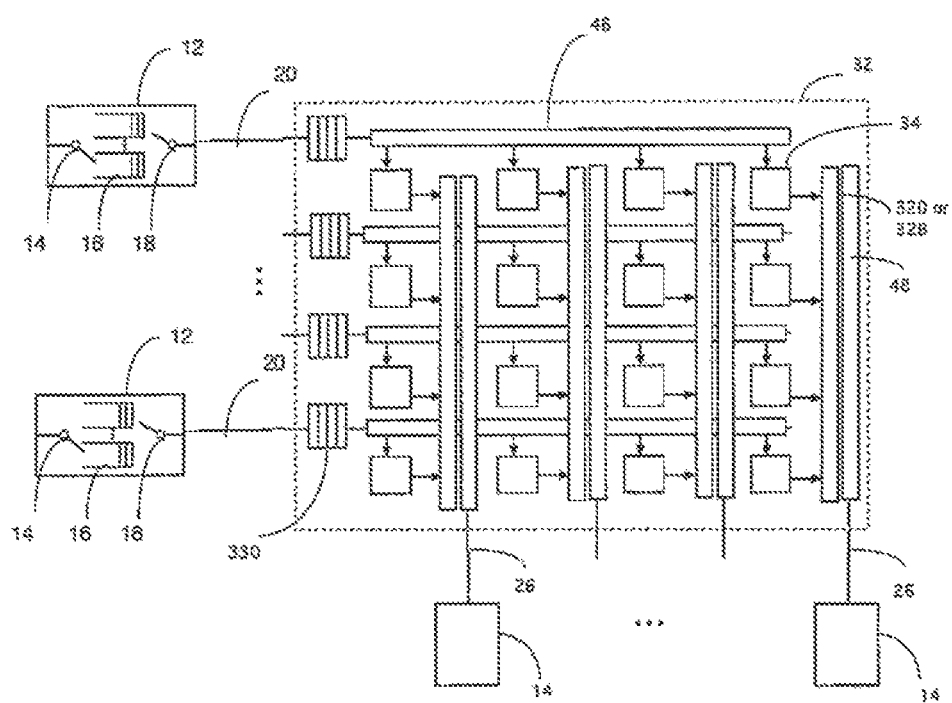
FIG. #14

FIG. 19

$$M1 = \begin{bmatrix} 8 & 4 & 2 & 1 \\ 1 & 8 & 4 & 2 \\ 2 & 1 & 8 & 4 \\ 4 & 2 & 1 & 8 \end{bmatrix}$$
F = 32

$$M2 = \begin{bmatrix} 4 & 2 & 1 & 1 \\ 1 & 4 & 2 & 1 \\ 1 & 1 & 4 & 2 \\ 2 & 1 & 1 & 4 \end{bmatrix}$$
F = 32

$$M1 + M2 = M12 = \begin{bmatrix} 12 & 6 & 3 & 2 \\ 2 & 12 & 6 & 3 \\ 3 & 2 & 12 & 6 \\ 6 & 3 & 2 & 12 \end{bmatrix}$$
F = 32

$$BE1 = \begin{bmatrix} 3 & 2 & 2 & 2 \\ 2 & 3 & 2 & 2 \\ 2 & 2 & 3 & 2 \\ 2 & 2 & 2 & 3 \end{bmatrix}$$

$$BE2 = \begin{bmatrix} 1 & 4 & 2 & 2 \\ 2 & 1 & 4 & 2 \\ 2 & 2 & 1 & 4 \\ 4 & 2 & 2 & 1 \end{bmatrix}$$

$$M12 + BE1 = \begin{bmatrix} 15 & 8 & 5 & 4 \\ 4 & 15 & 8 & 5 \\ 5 & 4 & 15 & 8 \\ 8 & 5 & 4 & 15 \end{bmatrix}$$
F = 32

$$M12 + BE2 = \begin{bmatrix} 13 & 10 & 5 & 4 \\ 4 & 13 & 10 & 5 \\ 5 & 4 & 13 & 10 \\ 10 & 5 & 4 & 13 \end{bmatrix}$$
F = 32

CROSSBAR SWITCH AND RECURSIVE SCHEDULING

CROSS-REFERENCE TO RELATED APPLICATIONS

This application is a national filing of International Application No. PCT/CA2009/001514, filed on Oct. 20, 2009, entitled "CROSSBAR SWITCH AND RECURSIVE SCHEDULING", listing T. H. Szymanski as the inventor which claims benefits from U.S. Provisional Patent Application No. 61/136,977 filed Oct. 20, 2008, the contents of which are hereby incorporated herein by reference.

FIELD OF THE INVENTION

The present invention relates generally to communications devices and methods, and more particularly to crossbar switches, such as Internet Protocol (IP) switches, and scheduling methods.

BACKGROUND OF THE INVENTION

Switches are important components of Internet Protocol routers, optical routers, wireless routers, ATM and MPLS switches, computing systems and many other systems. Three basic types of switch architectures exist. The Input-Queued (IQ) Switches, the Output-Queued (OQ) switches, and the Crosspoint Queued (XQ) switches. The Internet carries variable-size Internet Protocol (IP) packets which typically vary in size from 64 bytes up to a maximum of 1500 bytes. In synchronous Internet routers and switches employing fixed-sized cells, variable-size IP packets are reformatted into multiple fixed-sized cells which are stored in queues at the input side of the switch. These cells are scheduled for transmission through the switch by a scheduler, and are eventually switched to the output side where they may be stored in output queues. At the output side of the switch, the variable-size IP packets may be reconstructed from the fixed sized cells, and scheduled for transmission to the next router.

OQ switches place all the cell buffers (queues) at the output side of the switch. In each time-slot, each input port of the switch may receive up to one cell. Each cell has a tag which identifies the desired destination output port. Each input port simply forwards any cell it may receive to the desired output port in every time-slot, in an OQ switch, each output port (OP) may receive up to N cells simultaneously from all N input ports in each time-slot. A speedup of O(N) is required at each output port, to move up to N cells simultaneously into the output queue at each output port in one time-slot. Speedup is typically implemented by adding extra wires to the output ports of the switch, and by running the queue memories at the output ports N times faster than the queue memories at the input ports. The speedup is costly, and is usually avoided in practical switches. OQ switches can achieve up to 100% throughput with very simple scheduling algorithms, but they require an output 'speedup' of O(N) which renders them impractical for large switches. OQ switches are described in a paper by M. Hluchyi, M. Karol and S. Morgan, entitled "Input Versus Output Queueing on a Space Division Switch", *IEEE Trans Commun.*, vol. 35, 1987, which is hereby incorporated by reference.

In contrast, IQ switches place all the cell buffers at the input side of the switch. Each input port typically has N 'Virtual Output Queues' identified as VOQ(j,k), for $1<=j<=N$ and $1<=k<=N$. N×N IQ switch therefore has N-squared ($N^2$) VOQs. In each time-slot, each input port of the switch may receive up to one cell, which contains a tag which identifies the desired destination output port. At each input port, an arriving cell is moved into a VOQ associated with the desired output port. IQ switches typically are built with no extra speedup. IQ switches with no speedup operate under 2 constraints, called the input Constraint and the Output Constraint. The input constraint requires that every input port transmits at most 1 cell per time-slot to the switch. The output constraint requires that every output port receives at most 1 cell per time-slot from the switch. These constraints maim the scheduling of traffic through an IQ switch challenging. In each time-slot, a scheduler should find a set of up to N packets to transmit through the switch, which satisfies both the input and output constraints. A set of packets which satisfy these two constraints can be represented as a matching in a bipartite graph, or as a permutation matrix. A permutation matrix is defined herein as a matrix whose elements are only 0 or 1, where the sum of every row is $<=1$, and where the sum of every column is $<=1$. It has been shown in theory that IQ switches can achieve up to 100% throughput, but they require a complex scheduling algorithm to schedule the traffic through the switch subject to the input constraints and the output constraints. A paper by N. McKeown, A. Mekkittikul, V. Anantharam, J. Walrand, entitled "Achieving 100% Throughput in an Input-Queued Switch", IEEE Transactions on Communications, Vol. 47, No. 8, August 1999, pp. 1260-1267, is hereby incorporated by reference. This paper proposes a complex scheduling algorithm to achieve 100% throughput in an IQ switch.

Scheduling for IQ switches is known to be a difficult problem. The selection of a conflict-free set of up to N cells to transfer per time-slot is equivalent to finding a matching in to bipartite graph. Assuming a 40 Gbps link rate with 64-byte cells, the duration of a time-slot is 12.8 nanoseconds. Therefore, a scheduler for an IQ switch with 40 Gbps links computes a new bipartite graph matching every 12.8 nanosec. As Internet link rates increase to 160 or 640 Gbps, the time-slot duration would decrease to 3.2 and 0.8 nanoseconds respectively. The best known algorithms for computing a bipartite graph matching require $O(N^2.6)$ or $O(N^3)$ time which renders them too complex for use in Internet routers. Therefore, existing schedulers for IQ switches typically use heuristic or sub-optimal schedulers. Heuristic algorithms cannot achieve 100% throughput and cannot typically provide adequate bounds or guarantees on the performance and Quality of Service (QoS) of the switch.

Recently, an algorithm for scheduling traffic in IQ switches which can achieve 100% throughput while providing guarantees on the rate, delay, jitter and service lag was described in a US patent application by T. H. Szymanski, entitled 'Method and Apparatus to Schedule Traffic Through a Crossbar Switch with Delay Guarantees', application Ser. No. 11/802,937, Pub. No. US 2007/0280261 A1, which is hereby incorporated by reference. The document describes a recursive and fair method to decompose a N×N traffic rate matrix R, which describes the traffic requirements to be realised in an IQ switch in a scheduling frame of length. F time-slots. Each matrix element R(i,j) equals the requested number of connections between input port i and output port j, in the scheduling frame. An admissible traffic rate matrix is defined as a traffic rate matrix which does not overload the import ports or the output ports of the switch. Such a matrix has non-zero elements where the sum of every row is $<=F$ and where the sum of every column is $<=F$. The algorithm described in the patent application Ser. No. 11/802,937 will process an admissible traffic rate matrix and compute F bipartite graph matchings which are guaranteed to realize the traffic requirements in the traffic rate matrix. The method schedules N-squared traffic flows through an N×N IQ switch with guarantees on the performance and QoS. The algorithm has a computational complexity of O(NFlogNF) time to compute the F bipartite graph matchings for a scheduling frame, which is considerably more efficient than previously proposed scheduling algorithms for IQ switches. The algorithm eliminates all conflicts at the Input ports and Output ports of an IQ switch, by decomposing an N×N traffic rate matrix which reflects the coupled dependencies between the IO ports of the switch, in a recursive and fair manner.

The challenges of IQ switches and OQ switches have led to research on combined switches. Combined Input and Output Queued switches, denoted CIOQ switches, can achieve 100% throughput typically with a speedup of 2 or 4, but they also require complex scheduling algorithms which are considered too complex for Internet routers. A paper by H. Lee and S W. Seo, entitled "Matching Output Queueing with a Multiple Input/Output-Queued Switch", IEEE Transactions on Networking, Vol. 14, No. 1, February 2006, pp. 121-131, describes CIOQ switches and is hereby incorporated by reference. The paper describes a CIOQ switch which requires a speedup of 2 and which can exactly emulate the performance of an OQ switch. More recently, the research community is exploring Combined input and Crosspoint Queued switches, denoted CIXQ switches. CIXQ switches contain queues at the input Ports and at each crosspoint of the switching matrix. They may contain reassembly queues at the output ports, but these are inherent in most switches. A CIXQ switch contains N-squared (denoted $N^2$) VOQs at the input side, and N-squared crosspoint queues (XQs) at the crosspoints of the switching matrix. In principle these switches can achieve up to 100% throughput, but they also require efficient scheduling algorithms.

The scheduling of traffic in a CIXQ switch is simplified relative to scheduling for an IQ switch, since the input and output ports are decoupled in the CIXQ switch. Scheduling consists of 2 independent processes. In step 1, cells are scheduled for transmission from the VOQs at the input side of the switch, into the XQs of the switching matrix. There is a one-to-one correspondence between the N-squared VOQs at the input side of the switch, and the N-squared XQs within the switching matrix. In step 2, cells are scheduled from the XQs of the switching matrix to the output ports of the switch. Once cells arrive at the output ports, the variable-size IP packets may be reconstructed at the output queues (if necessary) and transmitted to the next router towards the destination. The scheduling is simplified since the addition of the $N^2$ XQs in the switching matrix makes the scheduling of the input and output ports decoupled and independent. The input constraints and output constraints associated with an IQ switch do not need to be simultaneously satisfied by the N cells which are transmitted into the CIXQ switch in each time-slot. In principle, to achieve 100% throughput in a CIXQ switch, in each time-slot each input port can transmit to any non-full XQ, and each output port can receive from any non-empty XQ. Several prior papers present scheduling algorithms for CIXQ switches which examine the states of the $N^2$ VOQs and the $N^2$ XQs and make instantaneous scheduling decisions based upon the instantaneous states of the VOQs and/or the XQs. One such scheduling algorithm for buffered crossbar switches is described in the U.S. Patent Application by H. J. Chao et al, "Low Complexity Scheduling Algorithm for a Buffered Crossbar Switch with 100% Throughput", U.S. patent application Ser. No. 11/967,125, Pub. No. 2008/015259 A1, which is hereby incorporated by reference.

The throughput of an N×M switch is defined as the average number of cells transmitted from the IPs per time-slot, or received at the OPs per time-slot, assuming no cells are dropped within the CIXQ switch. An ideal N×N CIXQ switch will maintain a sustained transmission rate of N cells per time-slot, equivalent to 100% throughput, provided the traffic demands through the switch do not violate the IP or OP capacity constraints. A sub-optimal scheduling algorithm for a CIXQ switch with XQs of finite size will occasionally find that (1) an IP cannot transmit a cell because all XQs in the row are full, and (2) an OP cannot receive a cell because all XQs in the column are empty.

The throughput efficiency of a CIXQ switch with a sub-optimal scheduling algorithm may be improved by making the XQs larger, for example increasing the XQ capacity to 4 or 8 cells par crosspoint. However a major problem with this approach is cost. Increasing the capacity of each of the N-squared XQs in the switching matrix to 4 or 8 cells would result in a significant increase in hardware cost, compared to a switch with 1 cell buffer per crosspoint. A 64×64 switch with an XQ capacity of 1 cell will require 4K cell buffers in the switching matrix. A 64×64 switch with an XQ capacity of 4 cells will require 16K cell buffers in the switching matrix. The larger XQs will result in significant increases in the VLSI area of the switch and the cost of the switch. They will also result in (a) larger number of cells queued within each switch on average, (b) in larger average delays for cells traversing the switch, and (c) in larger delay jitter for cells traversing the switch, and (d) a larger service lag for traffic traversing the switch.

Several prior papers describe dynamic scheduling algorithms wherein input ports make scheduling decisions based upon the instantaneous states of VOQs and/or XQs. However, this approach is impractical for large routers or switches. In a large router, the IO ports and the switching matrix may be physically separated by distances of 10-100 feet, in a large router. The design of a large buffered crossbar switch with a capacity of 4 Terabits per second by IBM (hereafter called the IBM switch) is described in the paper by F. Abel et al, "A Four-Terabit Packet Switch Supporting Long Round-Trip Times", IEEE Micro, Vol. 23, No. 1, January/February 2003, pp 10-24, which is hereby incorporated by reference. This paper discusses the packaging of large switches and the impact of the large Round-Trip-Time (RTT) on the transmission lines associated with a large switch.

Electronic cables or short-distance parallel optical fibber ribbons are typically used to realize the transmission lines which interconnect the Input/Output Ports and the switching matrix. In the 4 Tbps IBM switch, the cables between the line-cards and switching matrix cards could be several hundred feet long. It can take up to 64 time-slots for a cell of data to traverse the cables from the IO ports to the switching matrix and visa-versa. Therefore, any dynamic scheduling algorithm where an IO port makes instantaneous scheduling decisions based upon the instantaneous states of the VOQs and/or XQs is impractical, as any information at an IF or OP on the states of the XQs can be many time-slots old and rendered useless, due to the large round-trip-time.

The design of a large buffered crossbar switch in CMOS VLSI is described in the paper by D. Simos, I. Papaefstathiou and M. G. H. Katevenis, "Building an FOC Using Large, Buffered Crossbar Cores", IEEE Design & Test of Computers, November December 2008, pp. 538-548, which is hereby incorporated by reference. This switch uses credit-based dynamic schedulers, where buffer overflow in the switch is reduced by having queues transmit 'credits' to traffic sources. The credit schedulers and output schedulers operate in a round-robin order. This paper indicates that buffer overflow is a problem in CIXQ switches, due to the limited sizes of the XQs. This paper also indicates that a basic IQ switching matrix will require much smaller silicon VLSI area than an CIXQ switching matrix. The XQs in the CIXQ switch occupy the majority of the VLSI area in a CIXQ switch. It is well known that the final cost of a silicon CMOS chip is some exponential power of its VLSI area.

Ideally, an optimal scheduling algorithm for a CIXQ switch would achieve 5 requirements simultaneously: (1) it can sustain up to 100% throughput given any admissible traffic pattern: (2) it would minimize the amount of queueing in the IO ports and in the XQs in the switching matrix, (3) it would not make instantaneous scheduling decisions based upon the instantaneous states of the VOQs or XQs in the switching matrix, (4) it would have acceptable computational complexity, and (5) it will provide guarantees on the delay, jitter and QoS for all traffic traversing the switch. An optimal scheduling algorithm for a CIXQ switch would require small XQs with a capacity of approximately 1 cell buffer per XQ. To date, no distributed scheduling algorithm for a CIXQ switch has been proposed in the literature which can achieve essentially 100% throughput and provide QoS guarantees while requiring XQ sizes of approx. 1 cell buffer per crosspoint. The IQ switch scheduling algorithm described in the US patent application Pub. No. US 2007/0280961 A1 by T. H. Szymanski referenced earlier can be used to schedule traffic in a CIXQ switch while requiring XQs with a maximum capacity of 1 cell buffer per crosspoint. While that algorithm is very efficient, it schedules N-squared traffic flows through an input-queued N×N switch, and it recursively decomposes and schedules an N×N traffic rate matrix in a centralized processor, due to the coupling of the input and output ports. For a CIXQ switch where the input and output ports are decoupled, it is desirable to find a simpler scheduling algorithm, in this application, a new scheduling algorithm and new designs of the CIXQ switch are presented to achieve the above goals.

One scheduling algorithm for CIXQ switches is described in the paper"On Guaranteed Smooth Scheduling for Buffered Crossbar Switches", by S M He, S T Sun, H T Guan, Q Zheng, Y J Zhao and W Gao, in the IEEE Transactions on Networking, Vol. 16, No. 3, June 2008, pp. 718-731 which is hereby incorporated by reference. This paper describes a scheduling algorithm called 'sMUX' to schedule the traffic on the N input ports and the N output ports of a CIXQ switch. However, the paper has several significant technical difficulties which are summarized.

(1) The iterative sMUX scheduling algorithm is identical to the well-known iterative 'Generalized Processor Sharing-Weighted Fair Queueing' (GPS-WFQ) scheduling algorithm, when the GPS algorithm is adapted for the situation of fixed-sized cells with guaranteed traffic rates.

The well-known GPS-WFQ algorithms are currently used in the Internet to provided fairness guarantees to traffic flows passing through an outgoing link or transmission line. The GPS-WFQ algorithms were developed by Parekh in his PhD thesis at MIT, and described in the paper by A. K. Parekh and R. G. Gallager, entitled "A Generalized Processor Sharing Approach to Flow Control in Integrated Service Networks: The Single Node Case", IEEE/ACM Trans. Networking, vol. 1, pp. 344-337, 1993, which is incorporated by reference. A second paper by the same authors entitled "A Generalized Processor Sharing Approach to Flow Control in Integrated Service Networks: The Multiple Node Case", IEEE/ACM Trans, Networking, vol. 2, no. 2, pp. 137-150, 1994 is incorporated by reference (2) They present a theorem that a CIXQ switch can achieve essentially 100% throughput, while guaranteeing that each XQ has a capacity of 2 cells per crosspoint. The theorem assumes that a bounded delay jitter implies a bounded queue size. Our own simulations of their scheduling algorithm indicate that for large (ie 64×64 switches) the XQs should have a capacity of approx. 5 or 6 cells per crosspoint queue to achieve essentially 100% throughput, when using the proposed scheduling algorithm.

Several prior papers also advocate the use of variable-size packets in CIXQ switches, IP packets typically vary in size from 64 bytes up to maximum of 1500 bytes. The typical maximum IP packet size of 1500 bytes is equivalent to about 24 fixed-sized cells of 64 bytes each. In CIXQ switches supporting variable-size packets, each XQ should contain enough memory to buffer the largest size IP packet, ie 24 cells. Therefore, the amount of memory required in a CIXQ switch with variable-size IP packets is at least 24 times the cost of the CIXQ switch with a single cell buffer per crosspoint. The $2^{nd}$ problem is the increase in jitter and service lag when variable-size IP packets traverse the switch. A large packet reserves an IP port or an OP port (ie an IO port) for its entire duration, which increases the delay jitter and service lag experienced by all other packets contending for the same IO ports. In this document, we will primarily focus on synchronous CIXQ switches with fixed-sized cells, although our scheduling algorithm and switch designs apply to variable-size IP packets and switches supporting variable-size IP packets.

SUMMARY OF THE INVENTION

In one embodiment, a combined Input and Crosspoint Queued Crossbar (CIXQ) switch has N input ports. M output ports, and a switching matrix with N×M crosspoints. Each crosspoint contains a queue, denoted an XQ, which can store one or more cells of data. The traffic rates to be realized between Input/Output (IO) pairs of the switch are specified in an N×M traffic rate matrix, where each element represents a guaranteed traffic rate bete each IO pair within a scheduling frame of F time-slots. An efficient algorithm for scheduling N traffic flows with guaranteed traffic rates through a multiplexer, based upon a recursive and fair decomposition of a traffic rate vector with N elements, is proposed. The algorithm may be used to process each row vector of the traffic rate matrix, to yield a deterministic Cell Transmission Schedule (CTS) for each input port. The CTS specifies the guaranteed cell transmission opportunities between the input port and the switching matrix for every time-slot in the scheduling frame. The algorithm can also be used to process each column of the matrix, to yield a deterministic Cell Reception Schedule (CRS) for each output port. The CRS specifies the guaranteed cell reception opportunities between the output port and the switching matrix for every time-slot in a scheduling frame. The CTS and CRS schedules can be re-used in consecutive scheduling frames, and are updated when the traffic rate matrix changes. To reduce switch delays to a near-minimum, a Dynamic Column Scheduling (DCS) algorithm is embedded into each column of the switching matrix. The Dynamic Column Scheduling algorithm selects a cell to remove from the switching matrix dynamically in each time-slot. To reduce memory requirements to a near-minimum, a 'Shared Row Queue' (SRQ) may be embedded in each row of the switching matrix, allowing the size of all the XQs to he reduced— possibly to one cell buffer. This switch is called the CIIXQ switch, to denote the 2 levels of input queues that it employs. To further reduce memory requirements, all the XQs in a column can be combined into a 'Shared Column Queue' with smaller memory requirements, which is embedded into each column. This switch is called the CIIOQ switch, to denote the 2 levels of input queues and extra level of output queues that it employs. It is shown that the proposed buffered crossbar switch designs, in conjunction with the fair input port scheduling algorithm and the DC column scheduling algorithm, may possibly achieve near 100% throughput with small buffer requirements, while providing probabilistic guarantees on the rate, delay and jitter for all scheduled traffic flows. The buffered switch designs can also support multiple prioritized traffic classes, where resources which are un-used by higher priority traffic classes can be used by a lower-priority traffic class.

In accordance with an aspect of the present invention, there is provided a crossbar switch for switching packets from inputs to outputs. The crossbar switch comprises n input ports, each feeding an associated group of m virtual output queues; an n×m switching matrix, having n×m cross points arranged in n rows and m columns, and a buffer at each of the n×m cross points; n row queues, each one interposed between one of the groups of m virtual output queues, and cross-points in a respective one of the n rows, at least one de-multiplexer to feed a packet at each of the n input ports into one virtual output queue of its associated group of m virtual output queues, as dictated by routing information in the packet, at least one multiplexer to empty m virtual output queues in a group in accordance with a schedule, into an interposed one of the n row queues, n row de-multiplexers each in communication with one of the n row queues, to feed queued packets to cross point buffers at a row corresponding to a row queue, and in a column dictated by routing information in the packets; and m output ports, each in communication with a respective column of the of n×m cross points to receive data from buffers in the column.

In accordance with another aspect of the present invention, there is provided a crossbar switch. The crossbar switch comprises n input ports, each feeding an associated group of m virtual output queues; an n×m switching matrix arranged in n rows and m columns; at least one de-multiplexer to feed a packet at each of the n input ports into one virtual output queue of its associated group of m virtual output queues, as dictated by routing information in the packet; n row queues, one in each row of the n×m matrix; n row multiplexers, each to empty m virtual output queues in a group in accordance with a schedule into an interposed one of the n row queues, n row de-multiplexers one in communication with each of the n row queues, m column queues, one in each column of the n×m matrix; m column multiplexers each in communication with one of the m column queues, the n row de-multiplexers and the m column multiplexers in communication with each other, and operating in synchronization to move queued packets from the n row queues to the m column queues, as dictated by routing information in each queued packet; m output ports, each in communication with a respective one of the m column queues to output packets therefrom.

In accordance with yet another aspect of the present invention, there is provided a method of scheduling n traffic flows through a multiplexer in F time slots. The method comprises: a. specifying a first traffic rate vector with n elements for the n traffic flows, wherein each dement of the traffic rate vector specifies a number of requested packet transmission opportunities for each of the n traffic flows in a scheduling frame of F time slots; b. using the first traffic vector as an input rate vector to a partitioning routine and F as the number of time slots of a defined scheduling frame length; c. performing the partitioning routine using the input rate vector, the performing comprising decomposing the input vector relatively fairly into K substantially-similar output traffic rate vectors, and wherein the sum of the K output rate vector equals the input rate vector; e. scheduling each of the K output rate vectors, to return a transmission schedule of length 1/K of the defined scheduling frame length; f. concatenating the K schedules computed for the K output rate vectors, to achieve a schedule for the number of time slots of the defined scheduling frame length.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 2 shows two known methods for representing the traffic requirements in a switch.

FIG. 4 shows a method 'Schedule_Matrix' to schedule traffic in an N×N CIXQ switch.

FIG. 5 shows a method 'Recursive_Schedule_Vector' to process one row vector (or column vector) of a traffic rate matrix recursively.

FIG. 6 shows a method 'Find_Next_One' to find the first element equal to '1' in a vector.

FIG. 7 shows a method Recursive_Schedule_Vector2, another embodiment of the method Recursive-Schedule-Vector in FIG. 5.

FIG. 9A shows one 8×8 traffic rate matrix for a CIXQ switch which is fully saturated.

FIG. 9B shows the first few steps of the method Recursive_Schedule_Vector FIG. 5, to schedule row #1 of the matrix in FIG. 9A.

FIG. 9C shows the first 64 cell transmission opportunities determined by method Recursive_Schedule_Vector of FIG. 5, for row #1 of the matrix in FIG. 9A.

FIG. 11A illustrates a hardware tree, celled Select_Random, used to select a non-empty XQ in a column of the switching matrix. FIG. 11B illustrates a node of the tree in FIG. 11A. FIG. 11C illustrates a truth table to generate the control signal for the node in FIG. 11B.

FIG. 11B illustrates a node of the tree in FIG. 12A.

FIG. 14 illustrates a modified CIXQ switch with reduced memory requirements, with the addition of a Shared-Row-Queue (denoted SRQ) for each row. This switch is denoted the CIIXQ switch, to denote the two levels of input queues which are individually scheduled.

FIG. 19 illustrates how multiclass traffic and best-effort traffic can be handled in an N×N buffered crossbar switch with a scheduling frame consisting of F time-slots.

DETAILED DESCRIPTION

Figure 1A:
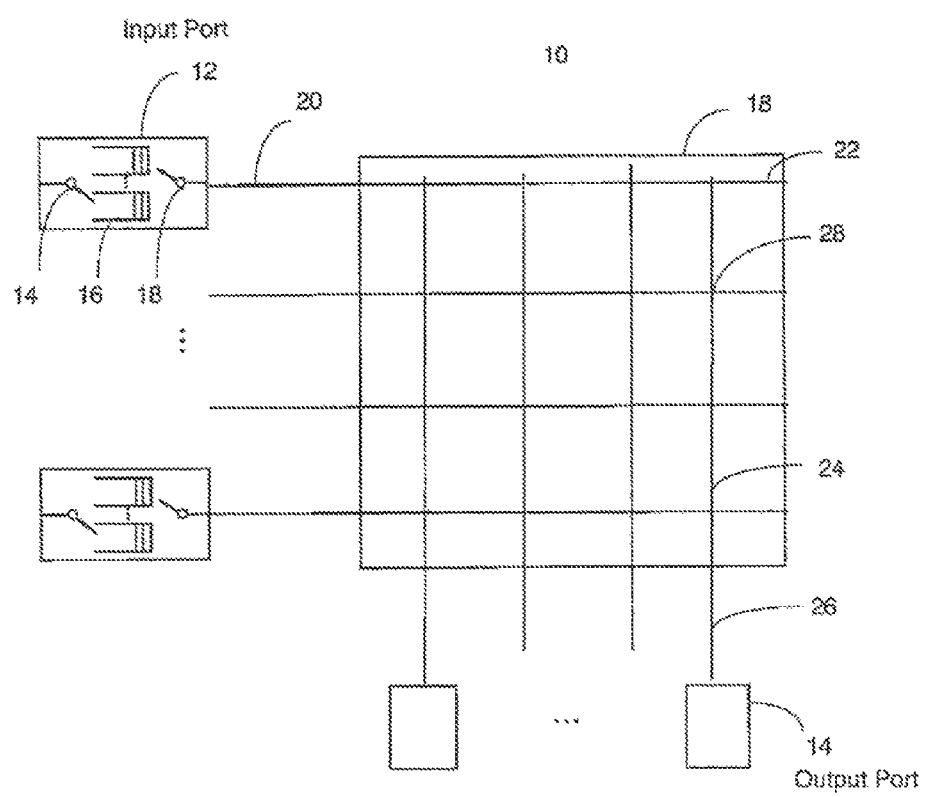
FIG. 1A shows an IQ switch system.

FIG. 1A illustrates a conventional N×N input queued (IQ) switch 10. IQ Switch 10 has N input ports 12-1, 12-2, ..., 12-N, herein collectively and individually referred to as input ports 12. IQ Switch 10 has N of ports 14-1, 14-2, ..., 14-N, herein collectively and individually referred to as output ports 14. Each input port 12 has a demultiplexer switch 14, N Virtual Output Queues (VOQs) 16, and a multiplexer switch 18, also called a server 18. A cell is a packet with a fixed size, typically 64 or 256 bytes. Each incoming cell of data contains a tag which identifies the desired output port of the IQ switch. Each incoming cell is forwarded through the demuitiplexer switch 14 to the VOQ 16 associated with the desired output port. Assume the input ports 12 are labelled from 1 up to N, starting from the top of FIG. 1A. Assume the output ports 14 are labelled from 1 up to N, starting from the left side of FIG. 1A. Let the N VOQs 16 at each input port j be denoted VOQ(j,k) 16, for $1<=k<=N$. Each VOQ(j,k) 16 stores all the cells at input or j 12 which are destined for output port k 14. IQ Switch 10 also includes an N×N 'switching matrix' 18. Each input port j 12 is connected by a incoming transmission line 20 to row j 22 of the switching matrix 18, for $1<=j<=N$. Each output port k 14 is connected to column k 24 of the switching matrix 18 by an outgoing transmission line 26, for $1<=k<=N$. The switching matrix 18 contains $N^2$ crosspoints 28, at the intersection of each row 22 and column 24. A programmable ON-OFF crosspoint switch exists at each crosspoint (not shown in FIG. 1A), to connect the row 22 to the column 24. When the crosspoint switch is enabled, a cell which is transmitted by input port j 12 on a row j 22 will appear at on column k 24 and output port k 14. The switching matrix 18 is typically implemented on one or more VLSI integrated circuits which typically reside on one or more printed circuit boards called switch-cards, which in turn reside in a rack or cabinet of electronic equipment, (not shown in FIG. 1A).

Figure 1B:
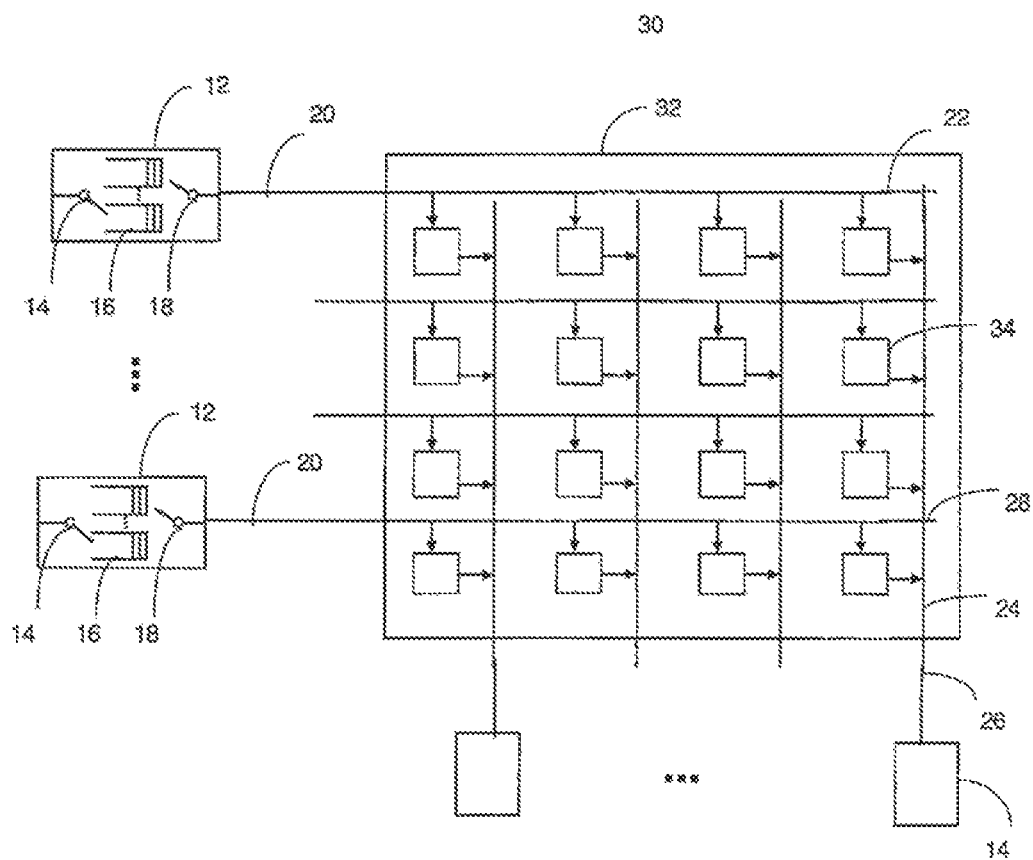
FIG. 1B shows an CIXQ switch system.

FIG. 1B illustrates a simplified model of a combined input and crosspoint queued (CIXQ) switch 30. CIXQ Switch 30 has N input ports 12 and N output ports 14, and a switching matrix 32. Each input port 12 has a demuitiplexer switch 14, N Virtual Output Queues (VOQs) 16, and a multiplexer switch 18, also called a server 18. Each crosspoint 28 in the switching matrix contains a crosspoint queue 34, denoted as XQ 34, capable of storing one or more cells of data. In each time-slot, each input part j 12 can transmit one cell of data from one of its VOQs 16, over the transmission line 20 to the switching matrix 32. The cell will be directed into the appropriate XQ 34 in row 22 by logic (not shown in FIG. 1B). Similarly, in each time-slot each column k 24 of the switching matrix can transmit one cell of data from one non-empty XQ 34 in column k 24, over the outgoing transmission line 26 to the output port k 14.

Figures 2A, 2B:
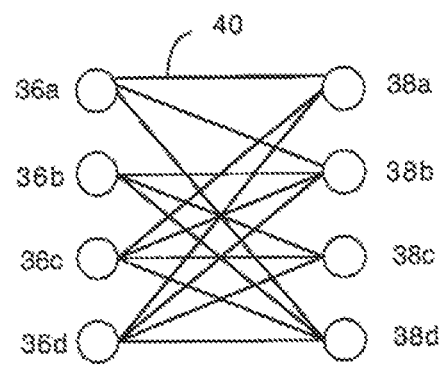
FIG. 2A shows a bipartite graph.
FIG. 2B shows a quantized traffic rate matrix.

FIG. 2 shows two conventional methods for representing the traffic requirements in a switch. FIG. 2A shows a bipartite graph 37. Every input port 12 is represented by a node 36 on the left side of the graph. Every output port 14 is a represented by a node 38 on the right side of the graph. The requested traffic rate between an input port j 12 and an output port k 14 is represented as a weighted edge 40 between the two nodes. An edge 40 may represent the number of connections to be made by the input port 12 to the output port 14 in one scheduling frame consisting of F time-slots. To ensure that every input port 12 is not overloaded, the sum of the weights of all edges leaving the node representing input port 12 is less than or equal to ($<=$) F. Similarly, to ensure that every output port 14 is not overloaded, the sum of the weights of all edges entering the node representing output port 14 is less than or equal to ($<=$) F. FIG. 2B shows a quantized traffic rate matrix R 42 Every input port j 12 is associated one row j of the matrix R. Every output port k 14 is associated with or column k of the matrix R. The requested traffic rate between an input port j and an output port k is represented by a matrix element R(j,k) 44. The matrix element R(j,k) 44 may represent the number of connections to be made by the input port j 12 to the output port k 14 in one scheduling frame consisting of F time-slots. To ensure that every input port j 12 is not overloaded, the sum of the matrix elements in row j is less than or equal to ($<=$) F. Similarly, to ensure that every output port k 14 is not overloaded, the sum of matrix elements in column k is less than or equal to ($<=$) F. An admissible traffic rate matrix is defined as one where all elements are non-negative, where the sum of every row vector is <=F, and where the sum of every column vector is <=F. If these conditions are not obeyed, then some input port 12 is requesting S>F reservations in a scheduling frame of F time-slots, which is impossible to accomplish, or some output port 14 is requesting S>F reservations in a scheduling frame of F time-slots, which is impossible to accomplish. Hereafter, we assume that every traffic rate matrix is admissible unless otherwise stated.

Cell Transmission Schedules

In FIG. 2B, each row vector j of the traffic rate matrix R 42 represents a vector of guaranteed traffic rates from input port j 12, to output ports 14, for 1<=k<=N, to be accomplished in one scheduling frame. Each traffic rate is expressed as a requested number of pail transmission opportunities in a scheduling frame consisting of time between input port j 12 and output port k 14. Similarly, each column vector k of the traffic rate matrix R 42 represents a vector of guaranteed traffic rates into output port k 14, from input ports j 12, for 1<=j<=N, to be accomplished in one scheduling frame.

Two concepts for CIXQ crossbar switches are now introduced, the deterministic Cell Transmission Schedule and the Cell Reception-Schedule, which can be reused repeatedly in each interval of time called a Scheduling Frame. A Cell Transmission Schedule Vector (CTSV) for an input port j, where 1<=j<=N, given a scheduling frame of F time-slots, is defined as a vector CTSV with F elements. Each element CTSV(t) is an integer between −1 and N inclusive. If the vector element CTSV(t)=m, for 1<=m<=N, then the given input port j has a guaranteed opportunity or reservation to transmit a cell to column m of the CIXQ switch at time-slot t. If element CTSV(t) equals 0, then the given input port j remains idle in time-slot t. The CTSV vector for input port FIGj may be stored as one row j in a 2 dimensional matrix CTS, for 1<=j<=N.

A Cell Reception Schedule Vector (CRSV) is defined similarly for output port k of the switch. A CRSV for an output port k where 1<=k<=N of an NxN switch, given a scheduling frame consisting of F time-slots, is defined as a vector CRSV with F elements. Each element CRSV(t) is an integer between 0 and N inclusive. If the vector element CRSV(t)=m, for 1<=m<=N, then the given column k of the switching matrix has a guaranteed opportunity to transmit a cell from XQ(m,k) to output port k of the CIXQ switch at time-slot t. If CRSV(t) equals 0, then the given output port k remains idle in time-slot t. This CRSV vector for output port k may also be one row k in a 2 dimensional matrix CRS, for 1<=K<=N.

Figure 3:
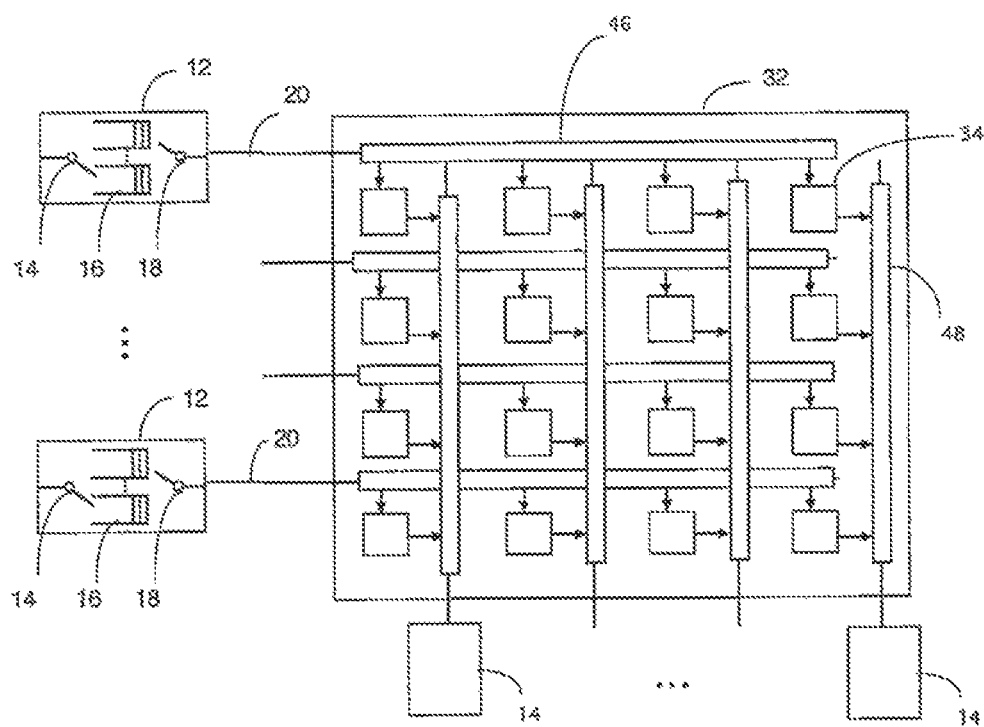
FIG. 3 shows a more detailed view of a CIXQ switch.

FIG. 3 illustrates a more detailed view of the CIXQ switch. Each Input Port j 12 is connected via a transmission line 20 to a Cell Demultiplexer Network (CDN) 46 spanning row j 22 of the switching matrix, for 1<=j<=N. The CDN 46 in row j will deliver a cell of data arriving from input port j to the appropriate XQ in row j. Each Output Port k 14 is connected via a transmission line 26 to a Cell Multiplexer Network (CMN) 48 spanning column k of the switching matrix, for 1<=k<=M. The CMN 48 in column k will select a cell of data from an XQ 34 in column k to be sent over the transmission line 26 to output port k 14. The CMN 48 in column k is controlled in each time-slot, to select a cell from an XQ 34 in the column. The methods in which the CMN 48 in each column k is controlled will be presented later in this document. Each crosspoint (j,k) 28 has an internal Crosspoint Queue (XQ) 34, which can hold 1 or more cells of data. At each crosspoint (j,k) 28, an output of the CDN 46 in row j is connected to the crosspoint queue XQ(j,k) 34, which is also connected to an input of the CMN 48 in column k. A cell can be transmit by input port j 12 and be delivered at one destination XQ(j,k) 34.

Each incoming cell may contain a destination tag of logN bits, which identifies the destination XQ 34 in the row and is used to control the CDN 46 for the row. There may be a significant delay, between 1-100 time-slots or larger, before a cell that is transmitted at an input port 12 is received at the switching matrix 32 if the transmission lines 20 are long. Similarly, a cell in XQ(j,k) 34 can be transmitted from column, k over transmission line 26 to appear at output port k. There may be a significant delay, between 1-100 time-slots or larger, before the cell is received at the output port 14 if the transmission lines 26 are long. The switching matrix 32 is typically implemented on one or more VLSI integrated circuits which reside on switch-cards, which in turn reside in a rack of electronic equipment.

FIG. 4 illustrates the method 'Schedule_Matrix (R,F,N)'. Line 100 is the start of the method, which accepts an admissible traffic rate matrix R, and parameters F and N. F is the number of time-slots in the scheduling frame, and N is the size of a row or column in matrix R. Matrix R is assumed to have size NxN, and it is straight forward to extend the method to handled matrix of size NxM. Line 100 illustrates that 2 matrices CTS and CRS are returned by the method. The loop in lines 102-108 ensure that the matrix R is admissible, given a scheduling frame consisting of F time-slots. Line 104 asserts that the sum of row j of the matrix R is less or equal to F. Line 106 asserts that the sum of column j of the matrix R is less or equal to F. If an assertion statement is not true, processing is terminated.

Lines 110-116 form a loop which will schedule every row vector with index j in the traffic rate matrix R. Line 112 copies the row vector j of matrix R into a vector V. Line 114 calls the method Recursive_Schedule_Vector with parameters V, F and N, and returns a vector with F elements. This vector is the cell transmission schedule vector for input port j, which is written in the matrix CTS in row j, with elements 1 . . . F.

Lines 118-124 form a loop which will schedule every column vector with index k in the traffic rate matrix R. Line 120 copies column vector k of the matrix R into a vector V. Line 122 calls the method Recursive_Schedule_Vecter with parameters V, F and N, and returns a vector with F elements. This cell reception schedule vector is written in the matrix CRS in row k.

FIG. 5 shows a method 'Recursive_Schedule_Vector (V,F, N,Fs)' to process one vector of a traffic rate matrix recursively. In line 130 the method accepts input parameters V, F, N and Fs, where V is a vector is be scheduled, F is the number of time-slots in the scheduling frame, N is the length of the vector.

Line 132 tests to see if parameter F is greater than 1. If line 132 is true, lines 134-178 are processed, to invoke the same scheduling method recursively. If line 132 is false, the recursion is terminated and line 182 is processed next. Each element of vector V represents a requested number of cell transmission opportunities for a traffic flows traversing a multiplexer in one scheduling frame of duration F time-slots. Line 134 computes a new vector Va, with the same length as vector V, where each element in Va is the floor of one half of the corresponding element in V. Line 136 computes a new vector Vb, which is initially equal to Va. Line 138 computes a new vector Vrem, with the same length as vector V, where each element Vrem(j)=0 if the corresponding element V(j) is even, or Vrem(j)=1 the corresponding element V(j) is odd. The requests for cell transmission opportunities in vector V are partitioned relatively evenly over vectors Va and Vb. The 1s in vector Vrem are allocated or assigned to vectors Va and Vb, such that the sum of elements in Va<=F/2, and the sum of elements in Vb<=F/2, and such that sum(Va) is nearly equal to sum(Vb). Line 140 counts the numbers of ones in Vrem and assigns this to variable 'num_ones'. Each one in the vector Vrem represents a cell reservation request which is assigned to either vector Va or vector Vb.

The ones in vector Vrem will be split substantially evenly over vectors Va and Vb, such that each vector is admissible. If variable num_ones is even, then each vector Va and Vb can be assigned exactly half of the requests in Vrem. If variable num_ones is odd, then each vector Va and Vb can be assigned floor (num_ones/2) requests. There will be one request remaining in Vrem, which is assigned to either vector Va or Vb.

Lines 144-158 form a loop which is repeated floor (num_ones/2) times. This loop processes pairs of ones in vector Vrem, assigning a one to each vector Va and Vb alternatively, thereby ensuring that sum(Va) sum(Vb) after each iteration of the loop. Line 146 find the next unassigned one in the vector Vrem, starting from index j+1, and the index of this unassigned one is stored in variable m1. Line 148 assigns this one to vector Va at the appropriate index m1. Line 150 find the next unassigned one in the vector Vrem, starting at index m1+1, in line 150, the index of this unassigned one is stored in variable m2. Line 152 assigns this one to vector Vb at the appropriate index m2.

The loop in lines 144-156 can assign the ones in vector Vrem to vectors Va and Vb in other orders, provided that each vector Va and Vb receives floor (num_ones/2) of the ones. For example, the first floor(num_ones/2) ones can be assigned to Va, and the next floor(num_ones/2) ones can be assigned to Vb.

Lines 158-172 are processed if the number of ones in vector Vrem is odd. Line 158 tests if the number of ones in vector Vrem is odd. If true, lines 160-170 are processed. If true, there is only one remaining unassigned one in vector Vrem. Line 160 finds the index of this last remaining unassigned one and assigns it to variable m3. Once this index is found, line 162 tests to see if the sum of the elements in Va is <= the sum of elements of Vb. If true, then the 1 can be added to vector element Va(m3) in line 164. If false, the 1 can be added to vector element Vb(m3) in line 188. Lines 158-172 ensure that vectors Va and Vb are admissible given a scheduling frame of duration F/2 time-slots.

Line 174 calls the same method recursively, with vector Va to be scheduled in a scheduling frame of duration F/2 time-slots. Since vector Va is admissible, a schedule must exist. The schedule for F/2 time-slots is returned in vector ScheduleA. Line 176 calls the same method recursively, with vector Vb to be scheduled in a scheduling frame of duration F/2. Since vector Vb is admissible, a schedule must exist. The schedule for F/2 time-slots is returned in vector ScheduleB. Line 178 concatenates the two schedules Schedule A with F/2 elements, and Schedule B with F/2 elements, into one schedule with F elements. After line 178 is processed, the function returns the schedule with F elements.

Line 180 is processed when the parameter F is equal to 1. In this case, the vector V must have at most a single one, otherwise it could not be admissible, which is a contradiction. Line 182 tests to see of vector V has a single one. If true, line 184 finds the index of this single one and assigns it to variable m1, and line 186 assigns a Schedule with 1 element, which contains m1. This schedule for 1 time-slot can be used to control a multiplexer server to service a cell from a flow with index m1. After line 186 is processed, this schedule with 1 element is returned. Line 188 is processed if vector V has zero ones and F=1. In this case, the server does not to service any flow in this time-slot, and the entry 0 is returned in a schedule with 1 element.

FIG. 6 shows a method 'Find_Next_One(V,j,k)' to find the first element equal to '1' in a vector V, starting at index j and processing the vector up until index k. The method accepts a vector V, and two indices j and k as inputs. Lines 202-212 simply examine every element in V sequentially, starting at index j and up until index k. The first that is encountered is identified in line 204, the index is stored in variable m in line 206, and the index is return in line 208, if no 1 is found in the vector V, line 214 assigns the value to the index m, which is returned in line 216.

The method Recursive_Schedule_Vector of FIG. 5 operates on vectors with N elements. As the recursion proceeds and the parameter F becomes smaller, more of the elements of the vectors become zeros. For example, consider a system with N=64 and F=1024 initially. After several levels of recursion, the parameter F will be small i.e. F=16. In this case, the sum of the vector elements is less then or equal to (<=) 16, and most elements of the vector of length 64 will be zeros. In this case, it is desirable to only record the non-zero elements in each vector. Each vector can be represented by a smaller matrix with 2 rows the first row is the number of requests in the non-zero elements of the vector, the second row contains the index of the non-zero elements of the vector. The methods of FIGS. 5 and 6 can be modified to operate only on the non-zero elements of the vector. These non-zero elements may be contained in a matrix with 2 rows, or may be represented as a set or list of elements with non-zero values. There are many conventional techniques in which to process vectors which are sparse and contain many zeros.

The method Recursive_Schedule_Vector of FIG. 5 can be modified in many ways. The recursion can be terminated when some smaller frame schedule length Fs is reached. For example, if F=1024 originally, the recursion can be terminated when F=32. At this point, the original scheduling problem with F=1024 has been partitioned into 32 smaller admissible scheduling problems each with F=32. The 32 smaller scheduling problems can be efficiently solved in parallel using a multicore processor, as found in modem laptop computers. The smaller scheduling problems can be scheduled using any known method to solve a scheduling problem. For example the well-known Generalized Processor Sharing and Weighted Fairing Queueing (GPS-WFQ) scheduling method developed by Parekh and Gallager can be used to solve the smaller scheduling problems. The GPS-WFQ method is described in a paper by A. K. Parekh and R. G. Gallager, entitled "A Generalized Processor Shoring Approach to Flow Control in Integrated Service Networks the Single Node Case", IEEE/ACM Transactions on Networking, Vol. 1, pp. 344-357, 1993, which is hereby in by reference.

FIG. 7 illustrates a method Recursive_Schedule_Vector2, which is an alternative embodiment for the method Recursive_Schedule_Vector of FIG. 5. In FIG. 7, the recursion is terminated when the frame size equals a predetermined parameter Fs. When this is true, a method Schedule_Interval is invoked to solve the smaller scheduling problem. The method Schedule_Interval can use fur example the well-known known Generalized Processor Sharing/Weighted Fair Queueing (GPS/WFQ) scheduling scheme.

The method in FIG. 7 typically results in less jitter in the scheduled traffic flows, where the jitter is defined as the variance in the time between departures of cells belonging to the same traffic flow. In line 220 the method accepts input parameters V, F, N and Fs, where V is a vector is be scheduled, F is the number of time-slots in the scheduling frame, N is the length of the vector, and Fs is the frame size at which to terminate the recursion. In line 222, the initial traffic rate vector Vinit is made visi=ble to the method.

Line 224 tests to see if parameter F is greater than Fs. If line 224 is true, lines 226-268 are processed, to invoke the same scheduling method recursively. If line 224 is false, the recursion is terminated and line 262 is processed next. Line 226 computes a new vector Va, with the same length as vector V, where each element in Va is the floor of one half of the corresponding element in V. Line 228 computes a new vector Vb, which is initially equal to Va. Line 230 computes a new vector Vrem, with the same length as vector V, where each element Vrem(j)=0 if the corresponding element V(j) is even, or Vrem(j)=1 the corresponding dement V(j) is odd. Line 232 finds the number of ones in vector Vrem and assigns this to variable 'num_ones'. Line 234 sorts the elements in vector Vinit in descending order, and returns the sorted order in the vector 'rates'. The indices of the sorted elements are returned in the vector 'flows'. This line can be computed once and reused for subsequent invocations of the method, ie it does not need to be recomputed for every invokation of the method.

Line 236 initializes a variable count to 0, and a loop index j to 1. Lines 238-248 form a while loop which is repeated until the variable count equals ceiling (num_ones/2) times. This loop processes traffic flows in order of descending rates. For each iteration j, the unprocessed traffic flow with the next highest rate is examined. The index of this flow is assigned to variable 'flow' in line 240. Line 242 tests to see if vector element Vrem(flow)=1. If true, this traffic flow has a one element in vector Vrem, which is assigned to vector element Va(flow) in line 244. In line 245, the counter count is incremented. In line 247, the loop index j is incremented, so that the next iteration of the loop will examine another traffic flow. After this loop has finished ceiling (num_ones/2) ones associated with traffic flows with a one in Vrem and with large traffic rates have been assigned to vector Va.

Line 249 assigns the variable count to 0. Lines 250-263 form a second while loop which is repeated until the variable count equals floor (num_ones/2). This loop processes the remaining unprocessed traffic flows in order of descending rates. For each iteration j, the unprocessed traffic flow with the next highest rate is examined. The index of this flow is assigned to variable 'flow' in line 252. Line 254 tests to see if vector element Vrem(flow)=1. If true, this traffic flow has a one element in vector Vrem, which is assigned to vector element Vb(flow) in line 256. In line 258, the counter count is incremented. In line 282, the loop index j is incremented, so that the next iteration of the loop will examine another traffic flow. After this loop has finished, the remaining floor (num_ones/2) ones associated with traffic flows with a one in Vrem have been assigned to vector Vb.

Line 264 calls the same method recursively, with vector Va to be scheduled in a scheduling frame of duration F/2 time-slots. The schedule for F/2 time-slots is returned in vector ScheduleA. Line 266 calls the same method recursively, with vector Vb to be scheduled in a scheduling frame of duration F/2. The schedule for F/2 time-slots is returned in vector ScheduleB. Line 268 concatenates the two schedules. Schedule A with F/2 elements, and Schedule B with F/2 elements, into one schedule with F elements. After line 268 is processed, the function returns the schedule with F elements.

Line 262 is processed when the parameter F is equal to Fs. In this case, the recursion terminates. The vector V contains the number of service requests for the N traffic flows, in a scheduling frame of duration Fs time-slots. The vector V is admissible, so a schedule must exist. Any conventional method to schedule N traffic flows over a wire or transmission line can be used. For example, the conventional Weighted Fair Queueing (WFQ) algorithm described in the paper by Parekh and Gallager which was incorporated earlier can be used to schedule these traffic flows.

FIG. 8 shows the recursive partitioning of a vector scheduling problem, denoted P(V,F) 300a, to yield 2 smaller vector scheduling problems 300b and 300c. The requests for service in vector V are partitioned relatively evenly into the vector Va in 300b and the vector Vb in 300c. Each vector is to be scheduled in a scheduling frame consisting of F/2 time-slots. In this relatively fair partitioning, 5 conditions are met:

$$V = Va + Vb, \qquad (1)$$

$$\text{for every element } Va(j), Va(j) <= Vb(j)+1, \text{ for } 1<=j<=N \qquad (2)$$

$$\text{for every element } Vb(j), Vb(j) <= Va(j)+1, \text{ for } 1<=j<=N \qquad (3)$$

$$\text{sum}(Va) <= \text{sum}(V)/2+1, \qquad (4)$$

$$\text{sum}(Vb) <= \text{sum}(V)/2+1. \qquad (5)$$

Figures 8A, 8B:
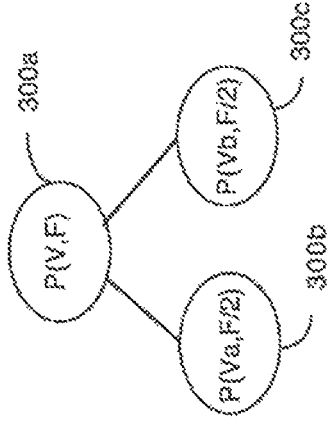
FIG. 8A shows the recursive partitioning of a traffic rate vector representing a scheduling problem, to yield 2 smaller traffic rate vectors representing two smaller scheduling problems.
FIG. 8B illustrates the operation of the method Recursive_Schedule_Vector in FIG. 5.

FIG. 8B illustrates the operation of the method in FIG. 5, to perform a relatively fair partitioning of a vector V 302a, with F=1024 and N=8. After one invocation of the method in FIG. 5, the final values of two vectors Va 302f and Vb 302h are computed. Vector Va 302f represents an admissible traffic rate vector to be realized in a smaller scheduling problem 300b in FIG. 8A. Vector Vb 302h represents an admissible traffic rate vector to be realized in a smaller scheduling problem 300c.

FIG. 9A shows an 8×8 traffic rate matrix R 40 which is fully saturated, given F=1024. The sum of every row of R=1024 which is <=F and the sum of every column of R=1024 which is <=F. This matrix R 40 is admissible but it will be difficult to schedule. The results of the method of FIG. 5 will be shown.

FIG. 9B shows the first few partitions of the vector scheduling problem P(V,F) 300d, where vector V1 is equal to row 1 of the matrix R 40 in FIG. 9A. The initial problem P1(V1, F=1024) 300d is partitioned into two smaller scheduling problems, P21(V21,F=512) 300e and P22(V22, F=512) 300f. The vectors V21 in 300e and V22 in 300f are explicitly shown. The vector V21 was computed in FIG. 8B and given the name Va 302f. The vector V22 was computed in FIG. 8B, and given the name Vb 302h.

FIG. 9C shows the first 64 elements of the schedule 304 determined by the method Recursive_Schedule_Vector in FIG. 5, given the vector V 302a which equals row 1 of matrix R 40.

Performance of the Basic CIXQ Switch

To determine the performance of the basic CIXQ switch, a computer program was created to simulated the N×N switch. For each N>N switch, 10 fully saturated admissible traffic rate matrices were generated. In practice, the traffic rate matrix for each switch can be generated by an Internet protocol, such as IntServ, DiffSem or the Resource Reservation Protocol RSVP. These protocols can be use to reserve bandwidth in the switches along a path in the Internet network. Each traffic rate matrix was scheduled using the method Schedule_Matrix of FIG. 4, to yield a cell transmission schedule vector (CTSV) for each input port 12. The CTSV for input port 12 was used to control the multiplexer server 18 in each input port 12, as shown in FIG. 3. Each traffic rate matrix was scheduled using the method Schedule_Matrix of FIG. 4, to yield a cell reception schedule vector (CRSV) for each output port 14. The CRSV for output port 14 was used to control the cell demultiplexer network (CDN) 48 corresponding to output port 14, as shown in FIG. 3. Each CIXQ switch was then simulated using the computed CTSV and CRSV schedules until a steady-state was reached. Ten fully saturated traffic rate matrices where scheduled and simulated, and the average results for these matrices are shown.

Figure 10A:
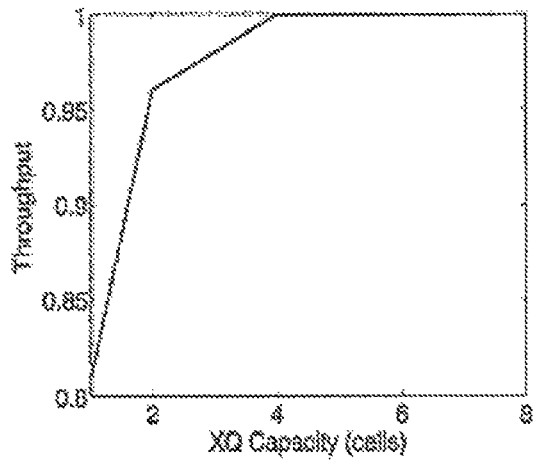
FIG. 10A illustrates the throughput for scheduling method Schedule_Matrix in FIG. 4, using the method Recursive_Schedule_Vector of FIG. 5, for a 16×16 switch, as the size of the crosspoint queues (XQs) varies from 1, 2, 4 and 8 cells.
Figure 10B:
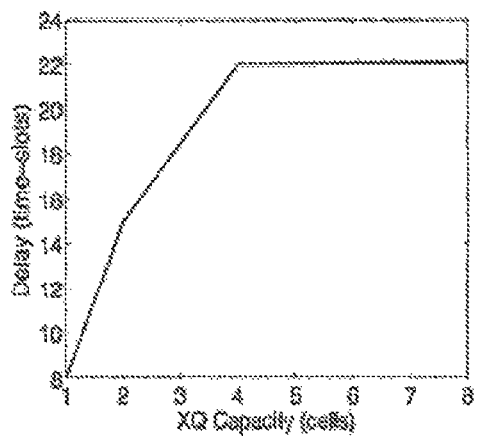
FIG. 10B illustrates the average cell delay for the method Schedule_Matrix in FIG. 4, using the method Recursive_Schedule_Vector of FIG. 5, for a 16×16 switch, as the size of the XQs varies from 1, 2, 4 and 8 cells.

FIG. 10A illustrates the average throughput for the method Schedule_Matrix in FIG. 4, for a 16×16 CIXQ switch, as the capacity of the XQs 34 in CIXQ switch 32 varies from 1, 2, 4 and 8 cells. The throughput is expressed as a percentage of the peak throughput of 100 percent. FIG. 10B illustrates the average delay for the same switch. FIGS. 10A and 10B illustrate that a CIXQ switch with an XQ capacity=1 cell achieves a throughput of about 81% and an average delay of about 8 time-slots. When the XQ capacity equals 2 cells, the CIXQ switch achieves a throughput of about 96% and a delay of about 15 time-slots. When the XQ capacity equals 4 cells, the switch achieves a throughput of between 99% and 100% (ie essentially 100%) and a delay of about 22 time-slots.

Based on FIG. 10, the throughput of a CIXQ switch can approach 100% when the capacity of each XQ 34 is large, i.e. 4 or 8 cells. However, there N-squared XQs 34 in the switching matrix 32, and irrtroducing large XQs at each crosspoint will be costly in hardware, and wits increase delays. An approach which improves the delay and throughput significantly is introduced next.

Dynamic Column Scheduling

In the method Recursive_Schedule_Vector of FIG. 5, a deterministic cell reception schedule vector (CRSV) is precomputed for each output port 14, based upon the traffic rate matrix. Referring to FIG. 3, this CRSV is used to control the Cell Demultiplexer Network (CDN) 48 associated with the output port 14 in the switching matrix 32. For each time-slot t in a scheduling frame, each output port 14 has 2 possibilities, (a) it remains idle, or (b) it has a guaranteed cell reception opportunity with some XQ 34 in the corresponding column of the switching matrix 32. The CDN 48 associated with output port 14 selects one specific XQ 34 in the corresponding column. If the selected XQ 34 has one or more cells, one cell is removed by the CDN 48 and transmitted to the output port 14.

Occasionally, when an output port 14 has a guaranteed cell reception opportunity with an XQ 34x, the XQ 34x will be empty. The output port 14 will be unable to receive a cell even though it has a guaranteed cell reception opportunity with some XQ 34x, and its throughput will drop. To avoid this performance degradation, a fast hardware-based Dynamic Column Scheduling (DCS) hardware circuit can be designed for each column 24 of the switching matrix 32. At the beginning of each time-slot, the DCS circuit for a column 24 will identify a non-empty XQ 34y in the column. Therefore, if the CRSV for this output port 14 indicates an idle time-slot, the output port 14 can receive a cell from the XQ 34y selected by the DCS hardware. Also, if the CRSV for output port 14 indicates that the output port 14 has a guaranteed cell reception opportunity with a XQ 34x but the XQ 34x is empty, then the output port 14 can receive a cell from the XQ 34y selected by the DCS hardware.

FIG. 11A illustrates dynamic column scheduling hardware tree 320, called Select_Random. The tree consists of nodes 322 arranged in a tree topology. Each column of the switching matrix 32 in FIG. 3 may have a dynamic column scheduling hardware tree 320 (not shown in FIG. 3). The tree 320 in FIG. 11A will select a non-empty XQ 34 in a column at random. FIG. 11B illustrates a node 322 of the tree 320 in FIG. 11A. The node 322 has 2 inputs at the bottom, 326a and 326b. Each input 326 receives a pair of numbers denoted (v, ind). The node 322 has one output 324 at the top, which outputs a pair of numbers (v2, ind2). The node 322 is a multiplexer, which is controlled by a bit C. If C=0, the pair of numbers at input 326a appears at the output 324. If C=1, the pair of numbers at input 326b appears at the output 324. FIG. 11C illustrates a truth table to generate the control signal C to control the node 320 in FIG. 11B. At each input 326, one signal 'v' may represents the number of cells in an XQ in the column, and the other signal 'ind' may represent the index of the XQ in the column (the index is between 1 and N). When both input signals v0 and v1 are non-zero, the node 322 randomly selects one pair of signals and propagates them to the output 324 at the top of the node. When only one input signal v0 or v1 is non-zero, the node 322 selects the pair of signals with the non-zero v signal and propagates the pair to the output port 324 at the top. The logic to determine the control signal for each multiplexer box is shown in FIG. 11C. To determine a random bit to break the ties, i.e. either 0 or 1, as linear feedback shift register (LFSR) circuit can be used to generate random bits (not shown).

Figures 12A, 12B:
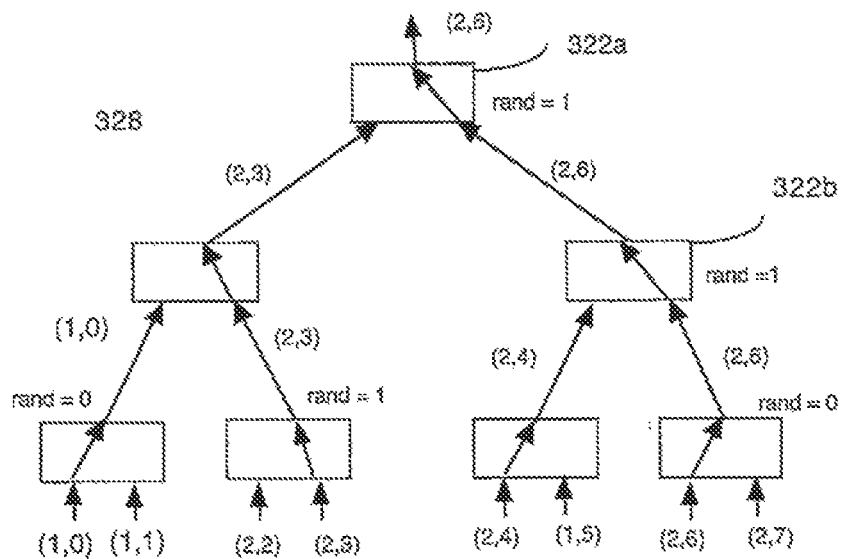
FIG. 12A illustrates a hardware tree, called Select_Maximum, used to select a non-empty XQ in a column of the switching matrix, with the maximum value of some performance metric.
FIG. 12B illustrates a truth table to generate the control signals for the node in FIG. 12A.

FIG. 12A illustrates a dynamic column scheduling hardware tree 328, called Select_Maximum. The tree consists of nodes 322 arranged in a tree topology. Each column of the switching matrix 32 in FIG. 3 may haves dynamic column scheduling hardware tree 328 (not shown in FIG. 3). The tree 328 will select a non-empty XQ 34 in a column with the maximum value of some performance metric. FIG. 11B illustrates a node 322 in the tree 328 in FIG. 12A. FIG. 12B illustrates a truth table to generate the control signal C for node 322 in FIG. 12A. In FIG. 12A, each node 322 is essentially a 2-to-1 multiplexer with an associated control signal C. Each node 322 accepts 2 signals on each of its inputs 326a and 326b at the bottom and outputs 2 signals on the output 324 at the top. At each input 326, one signal 'v' represents the performance metric of an XQ 34 in the column, and the other signal 'ind' represents the index of the XQ 34 in the column. The index is between 1 and N. When both input signals v0 and v1 are equal, the node 322 randomly selects one pair of signals and propagates them to the output port 324 at the top. When both input signals v0 and v1 are non-zero, the node 322 selects the one pair of signals with the larger v signal value and propagates the pair to the output port 324 at the top. When only one input signet v0 or v1 is non-zero, the node 322 selects the pair of signals with the non-zero v signal and propagates the pair to the output port 324 at the top. The logic to determine the control signal C for each multiplexer box is shown in FIG. 12C. To determine a random bit to break the ties, i.e. either 0 or 1 in each time-slot, a linear feedback shift register (LFSR) circuit can be used to generate random bits (not shown).

Figure 13A:
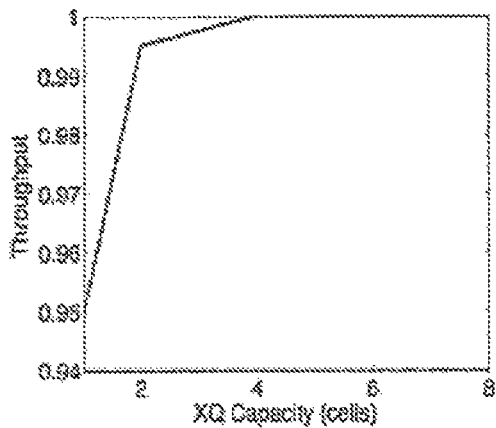
FIG. 13A illustrates the throughput for the method Schedule_Matrix in FIG. 4, using the method Schedule_Recursive_Vector in FIG. 5, in conjunction with the dynamic column scheduling hardware tree Select_Random FIG. 11 for a 16×16 switch, as the size of the XQs varies from 1, 2, 4 and 8 cells.
Figure 13B:
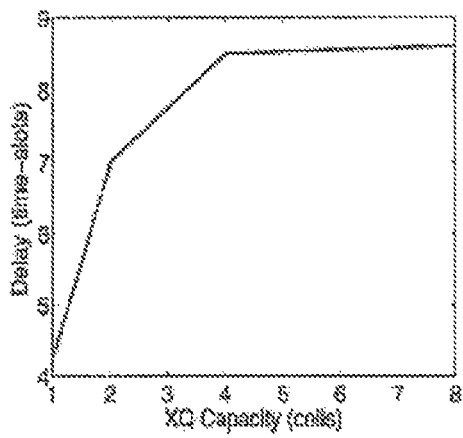
FIG. 13B illustrates the Average Cell Delay for the method Schedule_Matrix in FIG. 4, using the method Schedule_Recursive_Vector in FIG. 5, in conjunction with the dynamic column scheduling method Select_Random in FIG. 11 for a 16×16 switch, as the size of the XQs varies from 1, 2, 4 and 8 cells.

Consider a CIXQ switch as shown in FIG. 3, where a hardware tree 320 is added to each column of the switching matrix 32. FIG. 13 illustrates the performance of the CIXQ switch using the methods in FIG. 4 and FIG. 5, with a hardware tree 320 in each column. In a time-slot where an output port 14 has no cell to receive according to the CRSV, the output port 14 may receive a cell selected by the tree 320. FIG. 13A illustrates that CIXQ switch where each XQ 34 has a capacity of one cell achieves a throughput of about 95% and an average delay of about 4.25 time-slots, when using the method Schedule_Matrix of FIG. 4, in conjunction with hardware tree 320 of FIG. 11 in each column of the switching matrix 32. When each XQ has a capacity of 2 cells, the switch achieves a throughput of about 99.5% and a delay of about 7 time-slots. When each XQ has a capacity of 4 cells, the switch achieves a throughput of essentially 100% and a delay of about 8.5 time-slots. The addition of the hardware tree 320 in each column has resulted in a significant increase in the throughput and a significant decrease in the delay of the CIXQ switch. When the XQ capacity is 1 cell, the throughput of the basic switch has increased from 81% to 95%, by the addition of the hardware tree 320 in each column. Similarly, the delay has decreased from about 8 time-slots to about 4.25 time-slots. The performance of the CIXQ switch was simulated is the hardware tree 328 in each column, configured to select the XQ 34 with the largest number of cells. This can be called the 'Largest Queue First' (LQF) scheme. The performance was comparable to that shown in FIG. 13.

The Select Maximum tree 328 can be used to select cells with other performance metrics. For example, to implement a 'Largest Rate First' (LRF) scheme, the performance metric for an XQ(j,k) 34 is its entry in the traffic rate matrix R(j,k). To implement the LRF scheme, the traffic rate matrix may be downloaded into the switch by a control processor, so that each XQ 34 can store its rate R(j,k) as the performance metric to be processed by the hardware tree 328. To implement an 'Oldest Cell First' (OCF) scheme, each cell may have an associated 'entry-time' number, for example a 16 or 32 bit number, which is assigned to equal the time-slot when the cell arrives at the switch. The CIXQ switch may have a clock to record the current time-slot. The tree 328 in FIG. 12 is configured to select an XQ 34 in the column with the oldest cell, ie the smallest entry-time. The signal v associated with each XQ 34 is the cell entry-time. The truth table in FIG. 12C should be modified to select the pair of signals with the smallest v value at the input ports 326, rather than the largest v value, and to propagate the pair to the output port 324. The hardware trees 320 and 328 can also be used as the sole method for scheduling transmissions from the column XQs 34 to the output ports 14, ie the CRSV for each output port 14 can be eliminated completely and no CRSV need be computed for each output port 14. In each time-slot and in each column, the tree 320 or 328 determine a non-empty XQ 34 from which a cell is removed and transmitted to the associated output port 14.

The CIIXQ Switch with Shared Row Queues

It is desirable to further improve the switch performance, so that the throughput approaches 100% when the XQs 34 have a capacity of at most 1 cell. FIG. 14 illustrates a modified CIXQ switch. The CIXQ switch in FIG. 3 has been modified to include a 'Shared Row Queue' or SRQ 330 in each row 24 of the switching matrix 32. Call this the CIIXQ switch, to denote the 2 levels of input queues in the CIIXQ switch. Let each Cell Demultiplexer Network (CDN) 46 in row j of the switching matrix 32 he connected to the SRQ 330 in row j. This SRQ 330 can store incoming cells which input port j 12 transmits into the switching matrix 32 during a one time-slot, but which cannot be stored in the destination XQ 34 because the XQ is full.

The SRQ 330 also allows an input port 12 to transmit a cell into the switching matrix 32 in a time-slot when it does not have any scheduled cell transmission opportunity. This option may be useful to handle 'best effort' traffic, for which bandwidth has not been provisioned using the method of FIG. 4. Even a SRQ 330 with a small capacity of a few cells can lower the probability of losing a cell due to insufficient queueing capacity in the switching matrix.

A time-slot consists of 3 logical phases. In phase 1, each input port 12 may transmit one cell into an internal XQ 34 in row j of the switching matrix 32. In phase 2, each output port 14 may receive one cell from an internal XQ 34 in column j of the switching matrix 32, in phase 3, each SRQ 330 in row j may move any cell that it contains to the internal XQ 34 in row j desired by that cell. In other words, cells in the SRQ 330 use their destination tag to control the CDN 46, so that they are delivered to the correct XQ 34. It is expected that phases 1, 2 and 3 may be fully overlapped in the time domain. Phases 1 and 3 both use the same hardware, the CDN 46 in each row of the switching matrix 32. Therefore, contention may occur in the CDN 46, where two or more cells attempt to traverse the same wires and nodes in the CDN 46. Therefore, if a SRQ 330 is moving a cell into an XQ 34 over the CDN 46 in a row j, a newly arriving cell from input port j 12 may be buffered in the SRQ 330, if the CDN cannot deliver the cell to the XQ 34 due to contention with other cells. A CDN 46 may be designed to be able to deliver multiple cells to the XQs 34 in a row per time-slot. In this case, a newly arriving cell from an input port j 12 may bypass the SRQ 330 completely and move directly into the XQ 34, no contention occurs in the CDN 46.

Designs for the Shared Row Queues

Figure 15A:
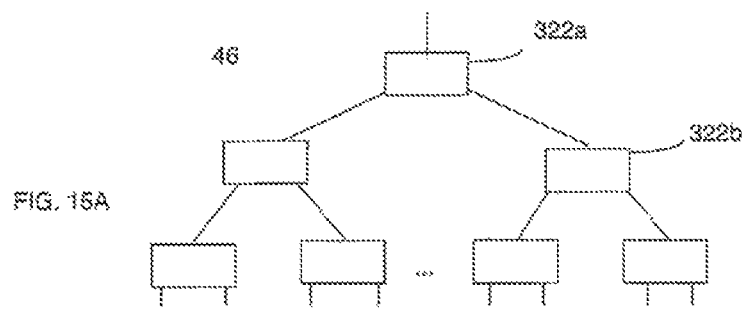
FIG. 15A illustrates the design of a Cell Multiplexer Network (CMN) using binary demuitiplexers for the CIIXQ switch.

FIG. 15 illustrates the design of the CDN 46. FIG. 15A illustrates one design of a CDN using standard 1-to-2 demultiplexer logic cells (with 1 input and 2 outputs), each represented by a box 322. At each box 322, the data arrives at the top input, and the data is routed to one of the two outgoing outputs at the bottom of the box 322, according to a control signal (not shown).

Figure 15B:
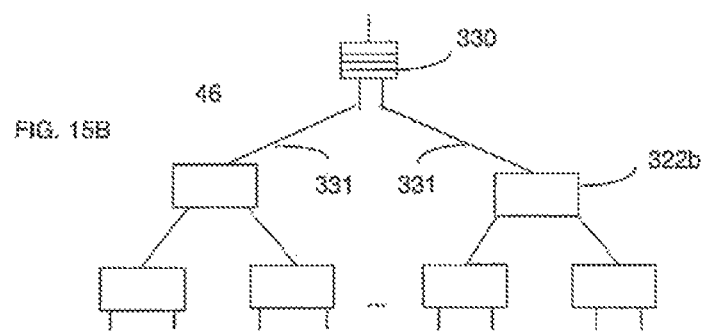
FIG. 15B and 15C also illustrates the addition of the SRQs into the CDN.

FIG. 15B illustrates a design of the CDN 46 where a shared row queue (SRQ) 330 has replaced the top-most box 322a. The SRQ 330 can be implemented with a standard dual-ported memory block, which can for example support one write and 2 reads simultaneously. Such multi-ported memory blocks are basic digital systems available from many manufacturers and are used in the design of microprocessors such as the Intel Pentium processor. In this design, the top-most demultiplexer box 322a is replaced by the dual ported memory SRQ 330 so that 2 cells of data can be simultaneously read from the SRQ and be delivered to the appropriate XQs in a row in a time-slot. To avoid conflict for wires 331 leaving the SRQ 330 to either half of the XQs in a row, at most one cell may be moved to either half of the XQs in a row. The design in FIG. 15B allows at most 2 cells to be removed from a SRQ 330 and delivered to the XQs in a row per time-slot.

Figure 15C:
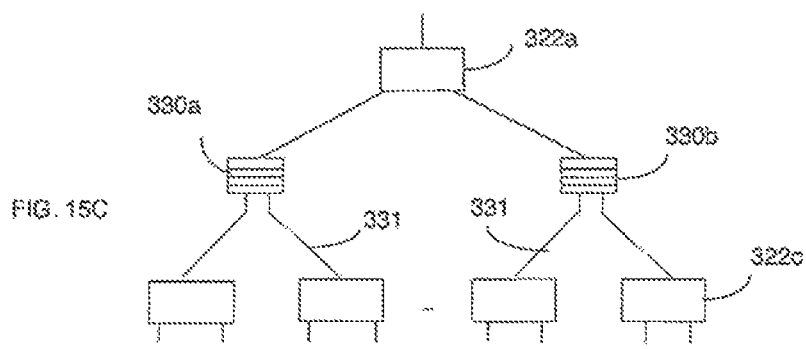

FIG. 15C illustrates a design for a CDN 46 where a SRQ 330 is split into 2 smaller SRQs 330a and 330b which service N/2 crosspoints each. Each smaller SRQ 330a or 330b can be placed after the top-most 1-to-2 demultiplexer box 332a. The smaller SRQs can be implemented with the same standard dual-ported memory block, which can support one write and 2 reads simultaneously. In this design, 2 cells of data can be simultaneously moved from each smaller SRQ 330a and 330b and be delivered to the XQs in the row. The XQs in the row can be divided into quarters, i.e. $1^{st}$, $2^{nd}$, $3^{rd}$ and 4th quarters. To avoid conflict for the wires 331 leaving the SRQ 330a or 330b to each quarter, at most one cell may be moved to each quarter of the XQs in a row. The design in FIG. 15C allows up to 4 cells to be removed from the small SRQs 330a and 330b and delivered to the XQs in a row per time-slot. To achieve designs for a CDN 46 which can deliver many cells per time-slot to a row, the CDN should utilize a larger number of SRQs.

Figure 16A:
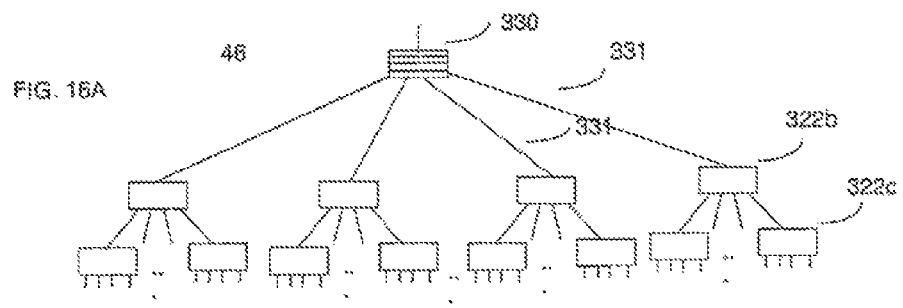
FIG. 16A illustrates the design of a Cell Demultiplexer Network (CDN) including a SRQ using degree-4 demultiplexers.
Figure 16B:
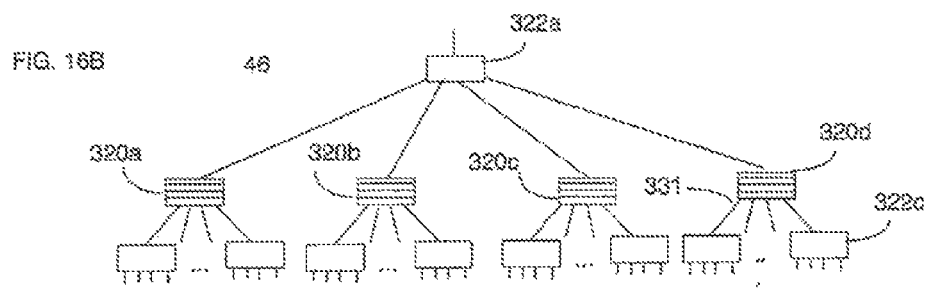
FIG. 16B illustrates the design of a Cell Multiplexer Network (CMN) including a SRQ using degree-4 multiplexers.

The CDN 46 design in FIG. 15 can also use larger 4-to-1 demultiplexer logic cells. FIG. 16A illustrates the design of a CDN 46 using degree-4 demultiplexer blocks 322. By using 4-to-1 demultiplexer blocks in the CDM, and 4-ported shared memory for the SRQs 330, (or dual ported memory clocked twice as fast to emulate a 4-ported memory), each SRQ 330 can deliver up to 4 cells to the row per time-slot. FIG. 16B illustrates the design of the CDN 46, where the SRQ 330 is realized with 4 smaller SRQs 320a, 320b, 320c, and 320d. By spitting a SRQ 330 into 4 smaller SRQs 330a-320d, each smaller SRQ can deliver up to 4 cells to the crosspoints in a row in each time-slot. In the CDN 46 design in FIG. 16B, up to 16 cells can be moved from four small SRQs 320a-320d to the XQs in a row per time-slot.

Figure 16C:
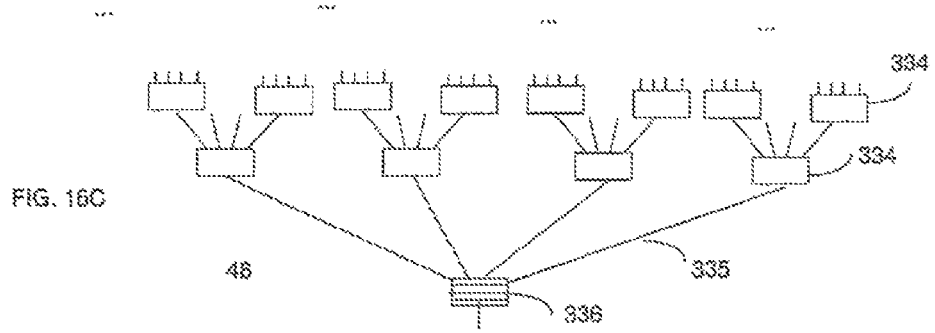
FIG. 16C and FIG. 16D illustrate two designs of a Cell Multiplexer Network (CMN) including a Shared-Column-Queue (SCQ) using degree-4 multiplexers.
Figure 16D:
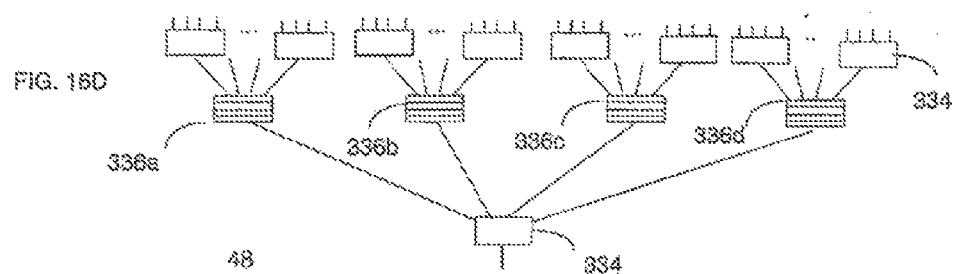

One may design the Cell Multiplexer Networks (CMNs) 48 in each column to include shared Column-Queues (SCQs), using a similar methodology as demonstrated earlier. A CMN 48 is shown in FIG. 16C. Each box in FIG. 16C is a 4-to-1 multiplexer box 334 A Shared Column Queue (SRQ) 336 is shown at the base of the tree. The SCQ 336 is a 4 ported memory, capable of receiving up to 4 cells at one time-slot, and capable of removing 1 cell per time-slot. The SCQ 336 will accept cells forwarded from the XQs or the SRQs, and store them, before they are transmitted to and received by the output port 14. An output port 14 attempting to receive a cell from a XQ 34 during a guaranteed cell reception opportunity would accept the cell from a SCQ 336 if the cell was in the SCQ 336, otherwise the cell in the scheduled XQ 34 would be received. In FIG. 16C, the SCQ 336 can receive up to 4 cells per time-slot from the XQs in a column, over the 4 wires 335 leading to the SCQ 336. FIG. 16D illustrates the design of a CMD 48 which uses 4 SCQs 336*a*, 336*b*, 336*c* and 336*d*. This CMN 48 can accept up to 16 cells per time-slot, from the XQs or the SRQs associated with the column.

Figure 17A:
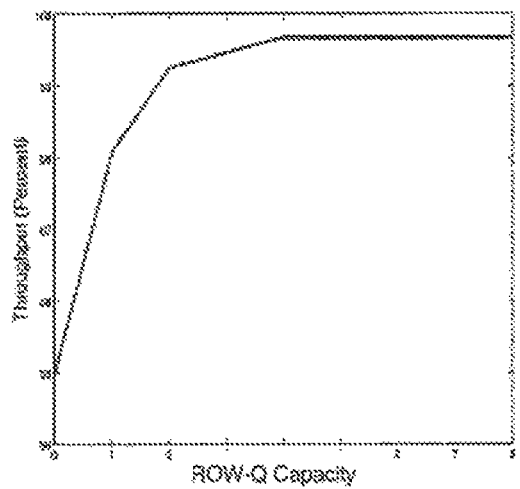
FIG. 17A illustrates the throughput for the CIIXQ switch in FIG. 14 with SRQs, using the method Schedule_Matrix in FIG. 4, in conjunction with the dynamic column scheduling method Select_Maximum, for a 16×16 switch, where all internal XQs have a capacity of 1 cell, and where the size of the SRQs in each row varies from 1, 2, 4 and 8 cells.
Figure 17B:
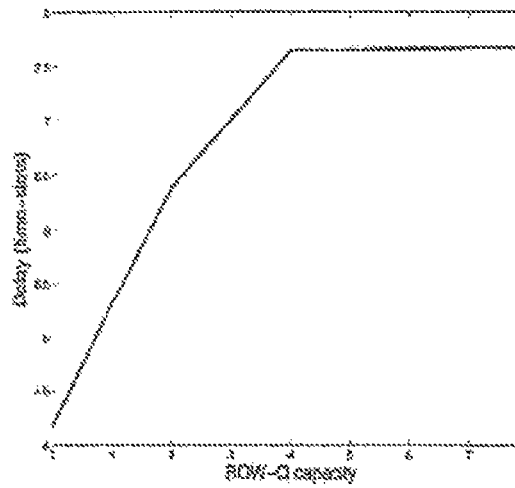
FIG. 17B illustrates the Delay for the CIIXQ switch in FIG. 14 with SRQs, using the method Schedule_Matrix in FIG. 4, in conjunction with the dynamic column scheduling method Select_Maximum, for a 16×16 switch, where all internal XQs have a capacity of 1 cell, and where the size of the SRQs in each row vanes from 1, 2, 4 and 8 cells.

FIG. 17 illustrates the performance of the CIIXQ switch using the DCS method, when all XQs have a fixed capacity of at most 1 cell. This switch design will reduce memory requirements, by constraining every XQ 34 to have a maximum capacity of 1 cell. Temporary buffer overflow caused by the small sizes of the XQs will be accommodated the storing the cells in the SRQ 330 associated with each row. In the x-axis, the capacity of the SRQ 330 varies from 0,1,2,4, and 8 cells. When the SRQ capacity=0 cells, the throughput is 95%. When the SRQ capacity=1 cell, the throughput increased to approx. 98%. When the SRQ capacity=2 cells, the throughput increases to between 99% and 100%, and when the SRQ capacity=8 cells the throughput is essentially 100%. The delay approx. 7.5 time-slots for a SRQ capacity of 4 or more cells. The performance of the CIIXQ switch is significantly better than the performance of the basic CIXQ switch shown in FIG. 9. The use of the SRQ 330 has reduced the memory requirements significantly, since each XQ 34 has a maximum capacity of 1 cell. Our simulations indicate that this CIIXQ switch, where the capacity of the XQs is fixed at 1 cell, and where the capacities of the SRQs is 4 or 8 cells, offers between 99% and 100% throughput for a large range of switch sizes.

When each crosspoint queue XQ 34 has a capacity of 1 cell and when each shared row queue 330 with a capacity of 2 cells, the total number of cell buffers in an N×N CIIXQ switch is $N^2+2N$. The average number of cell buffers per crosspoint is therefore $1+2N/N^2$. For N=16, the average number of cells per crosspoint is 1+32/256=1.125 cells per crosspoint. This figure is much lower than prior CIXQ switches with unity speedup which require XQs with a capacity of 2 cells or more, to achieve comparable performance.

Figure 18:
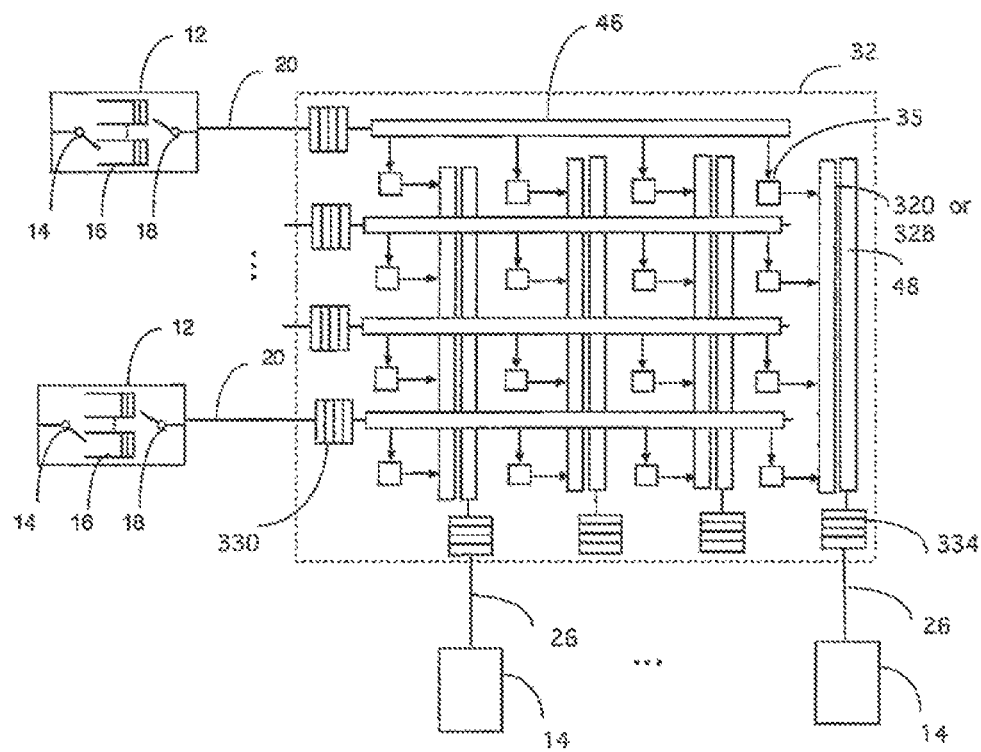
FIG. 18 illustrates a modified CIXQ switch with reduced memory requirements, with the addition of a Shared-Row-Queue (denoted SRQ) for each row, and a Shared Column Queue for each column. The XQs have been removed from the crosspoints. This switch is denoted the CIIOQ switch.

The use of shared memory SRQs 330 and SCQs 336 leads to a modified switch architecture called the CIIOQ switch, as shown in FIG. 18. Let the CDNs 46 in each row have many smaller SRQs 330, as shown in FIG. 15C or FIG. 16B. Each smaller SRQ 330 services a subset of all the XQs in a row. Due to the large number of smaller SRQs 330, each CDM 46 will be able to deliver many cells to each row per time-slot. Let the CMNs 48 have many smaller SCQs 336 placed within the CMN tree, as shown in FIG. 16C or FIG. 16D. Each smaller SCQ 336 services a subset of XQs in a column, in this new switch design, it is possible to remove the XQs 34 at each crosspoint completely, since the SRQs 330 and the SCQs 336 can replace their functionality. While the XQs 34 can be removed from the switching matrix, some control logic remains at each crosspoint, to enable the DCS hardware to function. In particular, we may introduce the concept of a Virtual Crosspoint Queue 35, or VXQ, 35 at each crosspoint. The VXQ(j,k) 35 contains relevant information, such as the number of cells stored in the shared row queue 330, that would normally be stored in XQ(j,k) 34. For example, when a cell is added into a SRQ 330, the logic at the corresponding VXQ 35 is updated to reflect the fact that a cell for this crosspoint is available in the SRQ 330. The DCS hardware described in methods 11 and 12, can process the VXQs 35 as before, and make decisions on which cells to remove, as before. When a cell is selected for removal from a VSQ 35 in a column, the VXQ 35 must signal the SRQ 330 and request the transmission of the cell, from SRQ 330 through the CDN 46, through the CMN 48 and into SCQ 336. Call this switch design the CIIOQ switch, to reflect the fact that there are input queues called VOQs at the input ports, shared input queues called SRQs 330 within the switching matrix, and shared output queues called SCQs 336 within the switching matrix. This CIIOQ switch design can further reduce the number of cell buffers and memory requirements in the CIIXQ switch, since it is well known that shared queues have the best statistical performance when compared to input queues or output queues. Our simulations indicate that the SCQs 336 need only have a capacity of approx N/4 cells, to achieve essentially 100% throughput. In other words, the CIIOQ switch can achieve essentially 100% throughput, when the number of buffers in the switch is approx. O(N/4) buffers per column.

Multiclass Traffic

FIG. 20 illustrates how multiclass traffic can be handled, in a 4×4 switch with a scheduling frame consisting of 32 time-slots. Suppose traffic class #1 requests the guaranteed traffic rates in the matrix M1 (upper left). This matrix can be scheduled using the method of FIG. 5, to yield the schedules CTS1 and CRS1 for traffic class #1. Suppose traffic class #2 requests the guaranteed traffic rates in the matrix M2 (upper left). We may compute a new matrix M12, which is the sum of matrices M1 and M2. This matrix M12 may be scheduled using the method of FIG. 5, to yield new schedules CTS21 and CRS21. To determine the CTS for class 2 traffic, the cell transmission opportunities which appear in CTS21 and which do not appear in CTS1 are allocated to class 2 traffic. To determine the CRS for class 2 traffic, the cell reception opportunities which appear in CRS21 and which do not appear in CRS1 are allocated to class 3 traffic. As many classes as desired can be processed using this methodology.

Suppose the remaining traffic is 'Best-Effort' traffic. The unprovisioned bandwidth of the switch can be allocated (provisioned) for best effort traffic as desired by the network administrators, provided that the total traffic demands are admissible. For example the network administrator may provision bandwidth for BE traffic as illustrated in the matrix BE1. Alternatively, the network administrator may allocate bandwidth for BE traffic as illustrated in the matrix BE2.

A network administrator often monitors the long-term traffic demands of every switch versus time of day, for every day of the week. Therefore, the administrators know the demands for multiclass traffic and for BE traffic in each switch. The long-term demand for BE traffic can be used to provision the bandwidth for BE traffic. Alternatively, a network administrator may implement a real-time monitoring system for each switch, which monitors the real-time BE traffic demands, and which recomputes a desired BE traffic rate matrix in real-time, so that sufficient bandwidth for BE traffic can be provisioned per scheduling frame.

Multicast traffic from one input port j to multiple output ports (k1, k2 and k3 for example), can be easily included in a traffic rate matrix, simply by ensuring that the traffic rate matrix elements (j,k1), (j,k2) and (j,k3) contain enough cell requests to accommodate the multiclass traffic.

In a real router, tens of thousands of individual traffic flows may traverse every pair of input port j and output port K in a switch. In this case, the traffic matrix element (j,k) includes the requested traffic rate to accommodate the aggregated demands of all tens of thousands of flows. To allocate this aggregated bandwidth fairly to individual flows, the well-known GPS scheduling algorithm described by Parekh and Gallager may be used.

Complexity of Method Recursive Fair Vector Schedule Method

There are N input ports. Each input port j performs the method Recursive_Schedule_Vector FIG. 5. Each invocation of the method requires O(N) work plus the work of the recursive invocations. The method is invoked at most O(F) times in total, for a total complexity of O(NF) work. However, the first results are available quickly, after logF invocations, since each invocation reduces the problem size by a factor of 2. The first results are available after O(NlogF) work per input port. In an N×N switch, there are N input ports and N output ports, so the total work in scheduling a matrix is O(N^2 F).

The work can be reduced by using the method Recursive_Schedule_Vector2, in FIG. 7, which terminates the recursion earlier. For example, let the recursion terminate after (½)logF steps, so that each smaller vector scheduling problem has root-F time-slots. Let the well-known GPS/WFQ scheduling algorithm be used to schedule each smaller problem (when adapted for fixed sized cells and guaranteed-rate traffic). The GPS/WFQ algorithm has complexity O(log) (root-F)) time to schedule each smaller problem. The first (½)logF levels of recursion require O(N(root-F)) work. The total work is therefore O(N(root-F))+(root-F)*O((logN) (root-F))=O(N(root-F))+O(FlogN).

Observe that the work is easily parallelized. Each input port can perform its recursive fair vector scheduling in isolation from any other input or output port. Similarly, each output port can perform its recursive fair vector scheduling in isolation from any other input or output port. The schedules at an input or output port only need to be recomputed when their GR traffic rate vectors change. If element (j,k) of the N×N traffic rate matrix changes, and all other elements remain unchanged, then the traffic rate vectors only change for input port j and output port k, and only the schedules for input port j and output port k need to be recomputed.

While specific embodiments of the present invention have been described and illustrated, it will be apparent to those skilled in the art that numerous modifications and variations can be made without departing from the scope of the invention as defined in the appended claims. The following claims are drafts.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of scheduling n traffic flows through a multiplexer in F time slots, comprising:
    a. specifying a first traffic rate vector with n elements for the n traffic flows, wherein each element of the traffic rate vector specifies a number of requested packet transmission opportunities for each of said n traffic flows in a scheduling frame of F time slots;
    b. using the first traffic vector as an input rate vector to a partitioning routine and F as the number of time slots of a defined scheduling frame length;
    c. performing said partitioning routine using the input rate vector, said performing comprising decomposing said input vector relatively fairly into K substantially-similar output traffic rate vectors, and wherein the sum of the K output rate vector equals the input rate vector;
    e. scheduling each of the K output rate vectors, to return a transmission schedule of length 1/K of said defined scheduling frame length;
    f. concatenating the K schedules computed for the K output rate vectors, to achieve a schedule for the number of time sots of the defined scheduling frame length.

2. The method of claim 1, further comprising
    g. repeating said performing said partitioning routine, and said scheduling, with each of said K output rate vectors as the input rate vector, and 1/K of said defined scheduling frame length as the number of time slots in said defined scheduling frame length.

3. The method of claim 2, wherein K=2.

4. The method of claim 1, further comprising repeating g. until the number of time slots in said defined scheduling frame length reaches a termination value.

5. The method of claim 1, wherein K=2.

6. A crossbar switch for switching packets from inputs to outputs, said crossbar switch comprising
    n input ports, each feeding an associated group of m virtual output queues;
    n×m switching matrix, having n×m cross points arranged in n rows and m columns, and a buffer at each of said n×m cross points;
    n row queues, each one interposed between one of said groups of m virtual output queues, and cross-points in a respective one of said n rows,
    at least one de-multiplexer to feed a packet at each of said n input ports into one virtual output queue of its associated group of m virtual output queues, as dictated by routing information in said packet,
    at least one multiplexer to empty m virtual output queues in a group in accordance with a schedule, into an interposed one of said n row queues,
    n row de-multiplexers each in communication with one of said n row queues, to feed queued packets to cross point buffers at a row corresponding to a row queue, and in a column dictated by routing information in said packets; and
    m output ports, each in communication with a respective column of said of n×m cross points to receive data from buffers in said column.

7. The crossbar switch of claim 6, further comprising m column queues, each interposed between one of said m output ports, and those buffers in a respective one of said m columns.

8. The crossbar switch of claim 6, further comprising m column multiplexers, one associated with each of said m columns, for multiplexing packets removed from buffers in an associated one of said m columns for provision to a corresponding one of said m output ports.

9. The crossbar switch of claim 8, where each of said m column multiplexers is controlled by a schedule computed using the method of claim 1.

10. The crossbar switch of claim 8, where each of said m column multiplexers is controlled by a schedule computed substantially in accordance with a weighted fair queuing scheduling algorithm.

11. The crossbar switch of claim 8, wherein each of said m column multiplexers removes packets in a buffer with the largest number of stored packets in said associated column.

12. The crossbar switch of claim 8, wherein each of said m column multiplexers removes packets in said associated column in order of age.

13. The crossbar switch of claim 6, wherein the schedule controlling the emptying of packets from each group of virtual output queues is determined in accordance with the method of claim 1.

14. The crossbar switch of claim 6, wherein the schedule controlling the removal of packets from the group of virtual output queues at each input port is determined in accordance with a weighted fair queueing scheduling algorithm.

15. The crossbar switch of claim 6, wherein the schedule controlling the emptying of packets from each group of virtual output queues is determined dynamically in each time-slot.

16. The crossbar switch of claim 6, wherein the capacity of each cross point buffer has a capacity of less than 5 packets.

17. The crossbar switch of claim 6, wherein the capacity of each of said n row queues is substantially less than n packets, and wherein the capacity of each cross point queue is less than 3 packets.

18. A crossbar switch, comprising
   n input ports, each feeding an associated group of m virtual output queues;
   an n×m switching matrix arranged in n rows and m columns;
   at least one de-multiplexer to feed a packet at each of said n input ports into one virtual output queue of its associated group of m virtual output queues, as dictated by routing information in said packet;
   n row queues, one in each row of said n×m matrix;
   n row multiplexers, each to empty m virtual output queues in a group in accordance with a schedule into an interposed one of said n row queues,
   n row de-multiplexers one in communication with each of said n row queues,
   m column queues, one in each column of said n×m matrix;
   m column multiplexers each in communication with one of said m column queues,
   said n row de-multiplexers and said m column multiplexers in communication with each other, and operating in synchronization to move queued packets from said n row queues to said m column queues, as dictated by routing information in each queued packet;
   m output ports, each in communication with a respective one of said m column queues to output packets therefrom.

19. The crossbar switch of claim 18, where the capacity of each of said m column queues is substantially less than n packets.

20. The crossbar switch of claim 18, wherein the capacity each shared row queue is substantially less than m packets.

21. The crossbar switch of claim 18, wherein the schedule controlling the removal of packets from the virtual output queues at each input port is determined using the method of claim 1.

22. The crossbar switch of claim 18, wherein each of said n row multiplexers removes packets from m virtual output queues in a group in accordance with a weighted fair queueing scheduling algorithm.

23. The crossbar switch of claim 18, wherein each of said n row multiplexers removes packets from m virtual output queues in a group in accordance with a schedule that is determined dynamically in each time-slot.

24. The crossbar switch of claim 18, wherein said n row de-multiplexers and said m column multiplexers in communication with each other, operate to move queued packets from said one of said m column queues having the largest number of queued packets first.

25. The crossbar switch of claim 18, wherein said n row de-multiplexers and said m column multiplexers in communication with each other, operate to move the earliest queued packets first.

* * * * *

UNITED STATES PATENT AND TRADEMARK OFFICE
CERTIFICATE OF CORRECTION

| | |
|---|---|
| PATENT NO. | : 8,503,440 B2 |
| APPLICATION NO. | : 13/124923 |
| DATED | : August 6, 2013 |
| INVENTOR(S) | : Ted Szymanski |

It is certified that error appears in the above-identified patent and that said Letters Patent is hereby corrected as shown below:

On the Title Page

In the Abstract, Item (57) line 4 "packets to be touted" should read -- packets to be routed --

In the Abstract, Item (57) line 19 "achieve high throughout" should read -- achieve high throughput --

In the Specification

Column 1, line 46 "every time-slot, in an" should read -- every time-slot. In an --

Column 1, line 66 "1<=k<=N. N×N" should read --1<=k<=N. An N×N --

Column 4, line 16 "8 cells par crosspoint" should read -- 8 cells per crosspoint --

Column 4, line 33 "instantaneous states of VOQs" should read -- instantaneous states of the VOQs --

Column 5, line 35 "scheduling algorithm, in this" should read -- scheduling algorithm. In this --

Column 6, line 43 "traffic rate bete each IO pair" should read -- traffic rate between each IO pair --

Column 10, line 32 "each input part j" should read -- each input port j --

Column 11, line 15 "requested number of pail" should read -- requested number of cell --

Column 11, line 33 "vector for input port FIGj" should read -- vector for input port j --

Column 12, line 19 "column in matrix R" should read -- column in the matrix R --

Column 12, line 21 "handled matrix of size N×M" should read -- handle a matrix of size N×M --

Column 13, line 13 "Lines 144-158 form a loop" should read -- Lines 144-156 form a loop --

Signed and Sealed this
Twenty-sixth Day of August, 2014

Michelle K. Lee
*Deputy Director of the United States Patent and Trademark Office*

CERTIFICATE OF CORRECTION (continued)

Column 13, line 16 "ensuring that sum(Va) sum(Vb)" should read -- ensuring that sum(Va) = sum(Vb) --

Column 13, line 22 "m1+1, in line 150" should read -- m1+1. In line 150 --

Column 14, line 46 "Generalized Processor Shoring" should read -- Generalized Processor Sharing --

Column 14, line 56 "can use fur example" should read -- can use for example --

Column 16, line 50 "For each N>N switch" should read -- For each N×N switch --

Column 16, line 53 "IntServ, DiffSem, or the" should read -- IntServ, DiffServ, or the --

Column 17, line 18 "However, there N-squared" should read -- However, there are N-squared --

Column 17, line 19 "and irrtroducing large XQs" should read -- and introducing large XQs --

Column 17, line 20 "and wits increase delays" should read -- and will increase delays --

Column 17, line 54 "FIG. 11A illustrates dynamic" should read -- FIG. 11A illustrates a dynamic --

Column 18, line 19 "FIG. 3 may haves dynamic" should read -- FIG. 3 may have a dynamic --

Column 18, line 28 "at the bottom and outputs 2 signals" should read -- at the bottom, and outputs 2 signals --

Column 18, line 38 "only one input signet" should read -- only one input signal --

Column 19, line 43 "switching matrix 32 he connected" should read -- switching matrix 32 be connected --

Column 19, line 60 "matrix 32, in phase 3" should read -- matrix 32. In phase 3 --

Column 21, line 34 "delay approx. 7.5 time-slots" should read -- delay is approx. 7.5 time-slots --

Column 21, line 62 "in a column, in this new" should read -- in a column. In this new --

In the Claims

In Claim 1, column 24, line 14 "sots of the defined" should read -- slots of the defined --